United States Patent
Liu

(10) Patent No.: US 12,447,199 B2
(45) Date of Patent: Oct. 21, 2025

(54) SYSTEM AND METHODS TO PROMOTE CELLULAR REGENERATION FOLLOWING ISCHEMIA

(71) Applicant: GEORGIA STATE UNIVERSITY RESEARCH FOUNDATION, INC., Atlanta, GA (US)

(72) Inventor: Zhi-Ren Liu, Atlanta, GA (US)

(73) Assignee: GEORGIA STATE UNIVERSITY RESEARCH FOUNDATION, INC., Atlanta, GA (US)

( * ) Notice: Subject to any disclaimer, the term of this patent is extended or adjusted under 35 U.S.C. 154(b) by 465 days.

(21) Appl. No.: 16/766,227

(22) PCT Filed: Nov. 21, 2018

(86) PCT No.: PCT/US2018/062213
§ 371 (c)(1),
(2) Date: May 21, 2020

(87) PCT Pub. No.: WO2019/104142
PCT Pub. Date: May 31, 2019

(65) Prior Publication Data
US 2020/0368329 A1 Nov. 26, 2020

Related U.S. Application Data

(60) Provisional application No. 62/589,451, filed on Nov. 21, 2017.

(51) Int. Cl.
*A61K 38/45* (2006.01)

(52) U.S. Cl.
CPC ...... *A61K 38/45* (2013.01); *C12Y 207/01004* (2013.01)

(58) Field of Classification Search
CPC .................................................. A61K 38/45
See application file for complete search history.

(56) References Cited

U.S. PATENT DOCUMENTS

2015/0374799 A1* 12/2015 Liu .................. A61K 35/28
435/375

FOREIGN PATENT DOCUMENTS

CN 104379161 A 2/2015

OTHER PUBLICATIONS

Search Results No. 13, 18 2022 (Year: 2022).*
Chain A, Pyruvate Kinase Pkm. NCBI PDB Accession No. 4QG9_A. Mar. 25, 2016; downloaded from the internet <https://www.ncbi.nlm.nih.gov/protein/4QG9_A?report=genbank&log$=protalign&blast_rank=2&RID=82ZAY5FK01R> on Mar. 7, 2019 pp. pp. 1-3.
Chen, D., et al., "Pyruvate Kinase M2 Increases Angiogenesis, Neurogenesis, and Functional Recovery Mediated by Upregulation of STAT3 and Focal Adhesion Kinase Activities After Ischemic Stroke in Adult Mice", Neurotherapeutics, vol. 15, Jun. 4, 2018, pp. 770-784.
Gao et al., "Pyruvate Kinase M2 Regulates Gene Transcription by Acting as a Protein Kinase," Mal. Cell. 45 (5):598-609, 2012.
Hashmi, S., et al., "Acute myocardial infarction and myocardial ischemia-reperfusion injury: a comparison", A Comparison. Int J Clin Exp Pathol., vol. 8, Aug. 15, 2015, pp. 8786-8796.
International Preliminary Report on Patentability received for PCT Patent Application No. PCT/US18/62213, mailed on Jun. 4, 2020, 10 pages.
International Search Report and Written Opinion received for PCT Patent Application No. PCT/US18/62213, mailed on Apr. 2, 2019, 12 pages.
Kalaiarasan, P., et al., "In Silico Screening, Genotyping, Molecular Dynamics Simulation and Activity Studies of SNPs in Pyruvate Kinase M2", Plos One, vol. 10, Mar. 13, 2015, pp. 1-21.
Liu, Z., et al., "Subacute intranasal administration of tissue plasminogen activator increases functional recovery and axonal remodeling after stroke in rats", Neurobiology of Disease, vol. 15, No. 2, Feb. 2012, pp. 804-809.
Office Action received for Chinese Application No. 201880087032.6, mailed on Feb. 18, 2025, 10 pages (4 pages of original office action and 6 pages of English Translation).
Tuor, U., et al., "Model of Minor Stroke with Peri-Infarct Ischemic Injury.", Journal of Neuroscience Methods, vol. 268, Apr. 29, 2016, pp. 56-65.
Yan, M., et al., "SAICAR activates PKM2 in its dimeric form", Biochemistry. Author manuscript, vol. 55, No. 33, Aug. 23, 2016, pp. 1-14.
Yang, W., et al., "Nuclear PKM2 regulates the Warburg effect", Cell Cycle, vol. 12, No. 19, 2013, pp. 3343-3347.
Office Action received for Chinese Application No. 201880087032.6, mailed on Jun. 27, 2025, 6 pages (4 pages of original office action and 2 pages of English Translation).

* cited by examiner

*Primary Examiner* — Ruth A Davis
(74) *Attorney, Agent, or Firm* — Judy Jarecki-Black; Sharon Ngwenya

(57) ABSTRACT

Systems and methods for promoting cellular regeneration in ischemic tissue through administration of pyruvate kinase M2 or a substantially similar therapeutic to the ischemic tissue are disclosed herein.

8 Claims, 9 Drawing Sheets

Specification includes a Sequence Listing.

SYSTEM AND METHODS TO PROMOTE CELLULAR REGENERATION FOLLOWING ISCHEMIA

CROSS-REFERENCE TO RELATED APPLICATIONS

This application is a national phase application of International Application No. PCT/US2018/062213, filed Nov. 21, 2018, which claims the benefit of U.S. Provisional Patent Application Nos. 62/589,541, filed Nov. 21, 2017, which are incorporated herein by reference in its entirety.

TECHNICAL FIELD

This disclosure relates to the systems and methods for improving recovery and tissue repair following ischemia by promoting angiogenesis and cellular regeneration.

BACKGROUND

Ischemia, such as that resulting from a stroke or a myocardial infarction remains a serious threat to human life. Generation of neuronal and vascular cells is an endogenous regenerative mechanism in the adult, which may contribute to tissue repair after such an ischemic event or series of ischemic events. However, the endogenous regenerative activity is typically insufficient for significant therapeutic effects after a stroke or a myocardial infarction. The viability of cells, tissues, and organs in the human body depends on adequate blood flow. Adequate blood flow provides cells with oxygen, glucose, and much needed nutrients that are important for the regulation of cellular physiology and metabolism. Adequate blood flow also allows cell and tissues to respond appropriately to environmental conditions that pose a risk of tissue damage or stress.

Accordingly, there is a need in the art for systems and methods of promoting regenerative activity following ischemic episodes. It is to this need, among others, that this disclosure is directed.

DEFINITIONS

Figure 1:
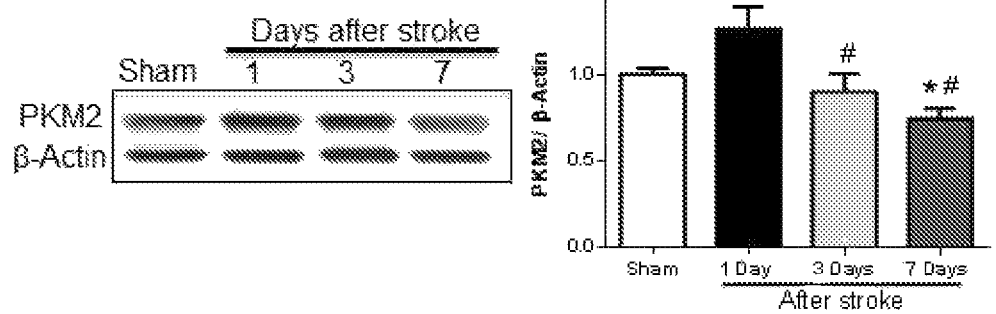
FIG. 1A provides western blot data showing expression of pyruvate kinase M2 (PKM2) in the peri-infarct region of the brains of sham versus the peri-infarct region of mice that underwent focal ischemic stroke.
FIG. 1B provides western blot data showing the effect of PKM2 administration on expression of PKM2.
FIG. 1C provides an image of a western blot showing the effect of post-stroke PKM2 administration and PKM2/BP-1-102 (BP) administration on expression of phosphorylated STAT3 (pSTAT3) at 7 days after focal ischemic stroke.
FIG. 1D provides a graphical representation of the western blot data showing the effect of PKM2 administration and PKM2/BP administration on expression of phosphorylated pSTAT3 at 7 days after focal ischemic stroke.
FIG. 1E provides a graphical representation of western blot data showing the effect of PKM2 administration and PKM2/BP administration on expression of phosphorylated pSTAT3 at 14 days after focal ischemic stroke.
Figure 1:
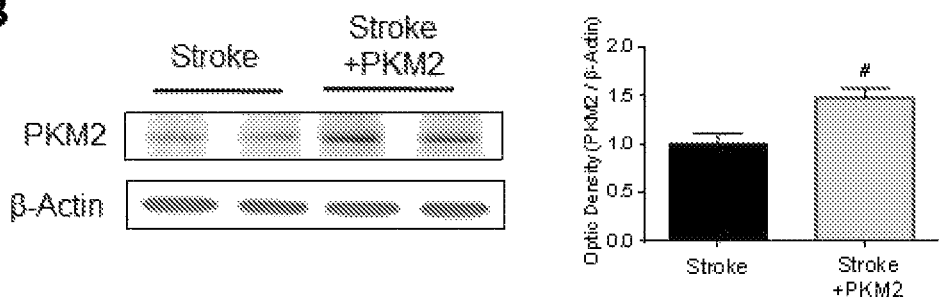
Figure 1:
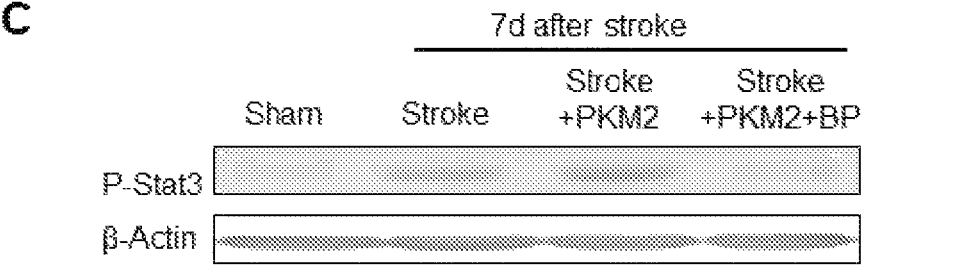
Figure 1:
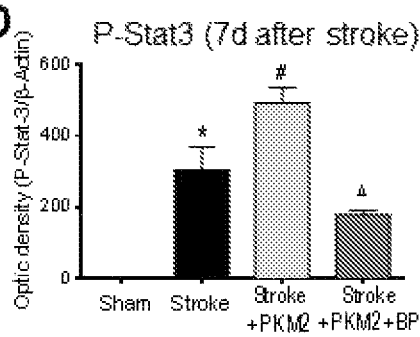
Figure 1:
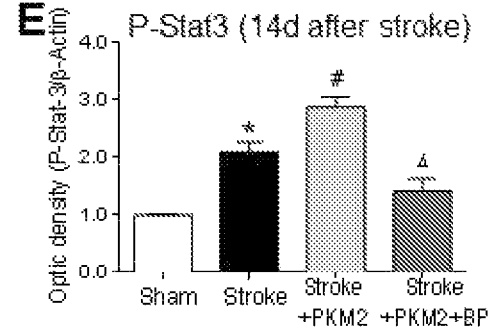

The following definitions are provided to facilitate understanding of certain terms used throughout this disclosure.

"Angiogenesis" is defined as any alteration of an existing vascular bed or the formation of new vasculature which benefits tissue perfusion. This includes the formation of new vessels by sprouting of endothelial cells from existing blood vessels or the remodeling of existing vessels to alter size, maturity direction or flow properties to improve blood perfusion of tissue.

The term "amino acid" refers to naturally occurring and non-natural amino acids, as well as amino acid analogs and amino acid mimetics that function in a manner similar to the naturally occurring amino acids. Naturally encoded amino acids are the 20 common amino acids (alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, and valine) and pyrolysine and selenocysteine. Amino acid analogs refers to compounds that have the same basic chemical structure as a naturally occurring amino acid, by way of example only, an alpha.-carbon that is bound to a hydrogen, a carboxyl group, an amino group, and an R group. Such analogs may have modified R groups (by way of example, norleucine) or may have modified peptide backbones, while still retaining the same basic chemical structure as a naturally occurring amino acid. Non-limiting examples of amino acid analogs include homoserine, norleucine, methionine sulfoxide, methionine methyl sulfonium.

The term "conservatively modified variants" applies to both natural and non-natural amino acid and natural and non-natural nucleic acid sequences, and combinations thereof. With respect to particular nucleic acid sequences, "conservatively modified variants" refers to those natural and non-natural nucleic acids which encode identical or essentially identical natural and non-natural amino acid sequences, or where the natural and non-natural nucleic acid does not encode a natural and non-natural amino acid sequence, to essentially identical sequences. By way of example, because of the degeneracy of the genetic code, a large number of functionally identical nucleic acids encode any given protein. For instance, the codons GCA, GCC, GCG and GCU all encode the amino acid alanine. Thus, at every position where an alanine is specified by a codon, the codon can be altered to any of the corresponding codons described without altering the encoded polypeptide. Such nucleic acid variations are "silent variations," which are one species of conservatively modified variations. Thus by way of example every natural or non-natural nucleic acid sequence herein which encodes a natural or non-natural polypeptide also describes every possible silent variation of the natural or non-natural nucleic acid. One of skill will recognize that each codon in a natural or non-natural nucleic acid (except AUG, which is ordinarily the only codon for methionine, and TGG, which is ordinarily the only codon for tryptophan) can be modified to yield a functionally identical molecule. Accordingly, each silent variation of a natural and non-natural nucleic acid which encodes a natural and non-natural polypeptide is implicit in each described sequence.

The term "effective amount," as used herein, refers to a sufficient amount of an agent or a compound being administered which will relieve to some extent one or more of the symptoms of the disease or condition being treated. The result can be reduction and/or alleviation of the signs, symptoms, or causes of a disease, or any other desired alteration of a biological system. By way of example, an agent or a compound being administered includes, but is not limited to, a natural amino acid polypeptide, non-natural amino acid polypeptide, modified natural amino acid polypeptide, or modified non-amino acid polypeptide. Compositions containing such natural amino acid polypeptides, non-natural amino acid polypeptides, modified natural amino acid polypeptides, or modified non-natural amino acid polypeptides can be administered for prophylactic, enhancing, and/or therapeutic treatments. An appropriate "effective" amount in any individual case may be determined using techniques, such as a dose escalation study.

The terms "ischemia," "ischemic condition," or "ischemic event" mean any decrease or stoppage in the blood supply to any cell, tissue, organ, or body part caused by any constriction, damage, or obstruction of the vasculature. Ischemia sometimes results from vasoconstriction or thrombosis or embolism. Ischemia can lead to direct ischemic injury, tissue damage due to cell death caused by reduced supply of oxygen (hypoxia, anoxia), glucose, and nutrients. "Hypoxia" or a "hypoxic condition" intends a condition under which a cell, organ or tissue receives an inadequate supply of oxygen. "Anoxia" refers to a virtually complete absence of oxygen in the organ or tissue, which, if prolonged, may result in death of the cell, organ or tissue.

Ischemia can be acute or chronic. "Acute ischemia" means an ischemia that causes symptoms to start abruptly. Acute ischemia can be due to substantial vascular damage and/or evolve from chronic ischemia. Acute ischemia can pose very serious risk to the loss of life or limb in a short period of time. "Chronic ischemia" means that the ischemic condition and symptoms have developed over a relatively long period of time. Chronic ischemia is often associated with genetic diseases, conditions of poor health, e.g., peripheral vascular disease, thromboangiitis obliterans, vasculitis, coronary heart disease and heart failure, atherosclerosis, and diabetes.

As used herein, the terms "enhance," "improve," "promote," "increase," or "activate" generally refer to the ability of a prostaglandin pathway agonist, optionally in combination with a glucocorticoid, to produce or cause a greater physiological response in a cell, as compared to the response caused by either vehicle or a control molecule/composition, and imbue the cell with improved therapeutic properties e.g., increased homing to ischemia-damaged tissue; reducing further damage to ischemic tissue and/or repairing damage to ischemic tissue through cell recruitment; increased vascularization in the ischemic tissue; tissue regeneration at the ischemic tissue site; decreasing ischemic tissue necrosis or apoptosis; and/or increased cell survival at the ischemic site. An "increased," "improved," or "enhanced" amount is typically a "statistically significant" amount, and may include an increase that is 1.1, 1.2, 1.5, 2, 3, 4, 5, 6, 7, 8, 9, 10, 15, 20, 30 or more times (e.g., 500, 1000 times) (including all integers and decimal points in between and above 1, e.g., 1.5, 1.6, 1.7. 1.8, etc.) the response produced by vehicle (the absence of an agent) or a control composition.

As used herein, the terms "decrease," "lower," "lessen," "reduce," or "abate" generally refer to the ability of a prostaglandin pathway agonist, optionally in combination with a glucocorticoid, to produce or cause a lesser physiological response in a cell, as compared to the response caused by either vehicle or a control molecule/composition. In one embodiment, the decrease can be a decrease in gene expression or a decrease in cell signaling that normally is associated with a reduction of cell viability. An "decrease" or "reduced" amount is typically a "statistically significant" amount, and may include an decrease that is 1.1, 1.2, 1.5, 2, 3, 4, 5, 6, 7, 8, 9, 10, 15, 20, 30 or more times (e.g., 500, 1000 times) (including all integers and decimal points in between and above 1, e.g., 1.5, 1.6, 1.7. 1.8, etc.) the response produced by vehicle (the absence of an agent) or a control composition.

Unless otherwise indicated, a particular nucleic acid sequence also implicitly encompasses conservatively modified variants thereof (e.g., degenerate codon substitutions) and complementary sequences, as well as the sequence explicitly indicated. Specifically, degenerate codon substitutions may be achieved by generating sequences in which the third position of one or more selected (or all) codons is substituted with mixed-base and/or deoxyinosine residues. The term nucleic acid is used interchangeably with gene, cDNA, mRNA, oligonucleotide, and polynucleotide.

The terms "polypeptide," "peptide" and "protein" are used interchangeably herein to refer to a polymer of amino acid residues. The terms apply to amino acid polymers in which one or more amino acid residue is an artificial chemical mimetic of a corresponding naturally occurring amino acid, as well as to naturally occurring amino acid polymers and non-naturally occurring amino acid polymer.

The term "pharmaceutically acceptable", as used herein, refers to a material, including but not limited, to a salt, carrier or diluent, which does not abrogate the biological activity or properties of the compound, and is relatively nontoxic, i.e., the material may be administered to an individual without causing undesirable biological effects or interacting in a deleterious manner with any of the components of the composition in which it is contained.

The term "prophylactically effective amount," as used herein, refers that amount of a composition containing at least one non-natural amino acid polypeptide or at least one modified non-natural amino acid polypeptide prophylactically applied to a patient which will relieve to some extent one or more of the symptoms of a disease, condition or disorder being treated. In such prophylactic applications, such amounts may depend on the patient's state of health, weight, and the like. It is considered well within the skill of the art for one to determine such prophylactically effective amounts by routine experimentation, including, but not limited to, a dose escalation clinical trial.

The phrase "substantially similar," in the context of two nucleic acids or polypeptides, refers to two or more sequences or subsequences that have at least 75%, preferably at least 85%, more preferably at least 90%, 95% or higher or any integral value therebetween nucleotide or amino acid residue identity, when compared and aligned for maximum correspondence, as measured using a sequence comparison algorithm such as those described below for example, or by visual inspection. Preferably, the substantial identity exists over a region of the sequences that is at least about 10, preferably about 20, more preferable about 40-60 residues in length or any integral value therebetween, preferably over a longer region than 60-80 residues, more preferably at least about 90-100 residues, and most preferably the sequences are substantially identical over the full length of the sequences being compared, such as the coding region of a nucleotide sequence for example.

The term "synergistic", as used herein, refers to a combination of prophylactic or therapeutic effective agents which is more effective than the additive effects of any two or more single agents. A synergistic effect of a combination of prophylactic or therapeutic agents may permit the use of lower dosages of one or more of the agents and/or less frequent administration of the agents to a subject with a specific disease or condition. In some cases, a synergistic effect of a combination of prophylactic or therapeutic agents may be used to avoid or reduce adverse or unwanted side effects associated with the use of any single therapy.

The term "therapeutically effective amount," as used herein, refers to the amount of a composition or biologic containing at least one non-natural amino acid polypeptide and/or at least one modified non-natural amino acid polypeptide administered to a patient already suffering from a disease, condition or disorder, sufficient to cure or at least partially arrest, or relieve to some extent one or more of the symptoms of the disease, disorder or condition being treated. The effectiveness of such compositions depend conditions including, but not limited to, the severity and course of the disease, disorder or condition, previous therapy, the patient's health status and response to the drugs, and the judgment of the treating physician. By way of example only, therapeutically effective amounts may be determined by routine experimentation, including but not limited to a dose escalation clinical trial.

The term "subject" as used herein includes mammals and humans.

The term "effective amount" is meant to include any amount of a composition or biologic, such as pyruvate kinase M2 or variant thereof, that is sufficient to bring about a desired therapeutic result, especially upon administration to a subject or upon administration in a cell culture assay.

The term "dosage" as used herein refers to the amount of a composition or biologic, such as pyruvate kinase M2 or variant thereof, administered to an animal or human or utilized in a cell culture assays. Suitable dosage units for use in the methods of the present invention include, but are not limited to, ng/kg bodyweight, mg/kg, mg/kg/day, M, nM, µM, or any other unit otherwise referred to in this disclosure or commonly used in the art.

The term "therapeutic agent" or "therapeutic" encompasses proteins, peptides, pharmacological agents, or other macromolecules or compositions that are known in the art. The therapeutic agent may be delivered to the recipient via inhalation, oral administration, subcutaneous injection; intraperitoneal injection, intravenous injection, intramuscular injection, intradermal injection, or any other method of agent delivery used in the art. Agents may be delivered as a single bolus or other one-time administration mechanisms; alternatively, agents may be administered via a sustained (continuous or intermittent) delivery.

The terms "treat," "treatment," "treating," and the like, refer to obtaining a desired pharmacologic and/or physiologic effect, including without limitation achieving amelioration, improvement, or elimination of symptoms of ischemia. The effect may be prophylactic in terms of completely or partially preventing ischemic tissue damage and/or may be therapeutic in terms of ameliorating, improving, or eliminating one or more symptoms of an ischemic tissue or tissue damaged by ischemia.

"Treatment," as used herein, covers any treatment of an ischemic condition in a mammal, particularly in a human, and includes: (a) preventing the ischemia from occurring in a subject which may be predisposed to the ischemia but has not yet been diagnosed as having it; (b) inhibiting the ischemia or preventing further ischemic tissue damage, i.e., arresting its development; (c) relieving the ischemia, e.g., causing revascularization of the tissue, e.g., to completely or partially eliminate symptoms of the ischemia; and (d) restoring the individual to a pre-disease state, e.g., complete revascularization of the previously ischemic tissue. "Treatment" may not indicate, or require, complete eradication or cure of the ischemia, or associated symptoms thereof. In particular methods of the invention, treatment or treating provides improved blood flow to an ischemic tissue, improved oxygenation of an ischemic tissue, improved vascularization of an ischemic tissue, and improved survival of ischemic tissue.

PKM2, as used throughout this specification, refers to pyruvate kinase isoform M2.

DETAILED DESCRIPTION

Generally, the application provides methods to reduce ischemic tissue damage in a subject. Prolonged ischemia results in a lack of oxygen or a "hypoxic" or "anoxic" condition in a cell, tissue, organ, or body part, and if the hypoxic/anoxic conditions persist long enough, ischemia may result in tissue necrosis and/or programmed cell death.

In various embodiments, the invention contemplates, in part, administering an effective amount of a therapeutic composition to a subject to reduce tissue cell damage. Specific embodiments contemplating treating subject with a therapeutic substantially similar or identical to pyruvate kinase M2 (PKM2).

In one embodiment, the composition and methods are directed to cardiac conditions that involve damaged cardiac tissue such as damage cardiac muscles arising from ischemic events, damages to the left ventricle such as those arising from congested heart failure, damages to the heart valves arising from diseases, such as coronary artery diseases. In all aspects, improving function of the damaged portion of the cardiac tissues would be a benefit to the patient.

One embodiment includes a method of promoting cellular regeneration to an ischemic tissue or a tissue damaged by ischemia, comprising administering a composition comprising a protein substantially similar wild-type pyruvate kinase M2 (PKM2) to the ischemic tissue or a tissue damaged by ischemia. The composition can have mutations from the wild-type sequence and the mutations can be a dimer.

Another embodiment includes a method of promoting cellular regeneration to an ischemic tissue or a tissue damaged by ischemia, comprising administering a composition comprising a modified pyruvate kinase M2 (PKM2) to the ischemic tissue or a tissue damaged by ischemia. The modified PKM2 has mutations from the wild-type PKM2 sequence that stabilize a dimer form of PKM2.

Another embodiment includes a method of promoting cellular regeneration to an ischemic tissue or a tissue damaged by ischemia, comprising administering a composition comprising a protein substantially similar or identical to wild-type pyruvate kinase M2 (PKM2) to the ischemic tissue or a tissue damaged by ischemia. The ischemia is not cerebral ischemia in that the ischemia.

Another embodiment includes a method of promoting cellular regeneration to an ischemic tissue or a tissue damaged by ischemia, comprising administering a composition comprising a protein substantially similar or identical to wild-type pyruvate kinase M2 (PKM2) to the ischemic tissue or a tissue damaged by ischemia. The protein can be a dimer and the ischemia is not cerebral ischemia in that the ischemia not is caused by a blockage in an artery that supplies blood to the brain in a subject. Cerebral ischemia is recognized by persons ordinary skill in the art in that cerebral ischemia or cerebrovascular ischemia is a condition in which there is insufficient blood flow to the brain to meet metabolic demand.] This leads to poor oxygen supply or cerebral hypoxia and thus to the death of brain tissue or cerebral infarction/ischemic stroke. Sullivan, Jonathon. "What is Brain Ischemia?". WSU Emergency Medicine Cerebral Resuscitation Laboratory. Retrieved 2008-11-11.

Another embodiment provides treatments for ischemia is associated with acute coronary syndrome, acute lung injury (ALI), acute myocardial infarction (AMI), acute respiratory distress syndrome (ARDS), arterial occlusive disease, arteriosclerosis, articular cartilage defect, aseptic systemic inflammation, atherosclerotic cardiovascular disease, autoimmune disease, bone fracture, bone fracture, brain edema, brain hypoperfusion, Buerger's disease, burns, cancer, cardiovascular disease, cartilage damage, cerebral infarct, cerebral stroke, cerebrovascular disease, chemotherapy-induced neuropathy, chronic infection, chronic mesenteric ischemia, claudication, congestive heart failure, connective tissue damage, contusion, coronary artery disease (CAD), critical limb ischemia (CLI), Crohn's disease, deep vein thrombosis, deep wound, delayed ulcer healing, delayed wound-healing, diabetes (type I and type II), diabetic neuropathy, diabetes induced ischemia, disseminated intravascular coagulation (DIC), frostbite, graft-versus-host disease, hereditary hemorrhagic telengiectasiaischemic vascular disease, hyperoxic injury, hypoxia, inflammation, inflammatory bowel disease, inflammatory disease, injured tendons, intermittent claudication, intestinal ischemia, ischemia, ischemic brain disease, ischemic heart disease, ischemic peripheral vascular disease, ischemic placenta, ischemic renal disease, ischemic vascular disease, ischemic-reperfusion injury, laceration, left main coronary artery disease, limb ischemia, lower extremity ischemia, myocardial infarction, myocardial ischemia, organ ischemia, osteoarthritis, osteoporosis, osteosarcoma, Parkinson's disease, peripheral arterial disease (PAD), peripheral artery disease, peripheral ischemia, peripheral neuropathy, peripheral vascular disease, pre-cancer, pulmonary edema, pulmonary embolism, remodeling disorder, renal ischemia, retinal ischemia, retinopathy, sepsis, skin ulcers, solid organ transplantation, spinal cord injury, stroke, subchondral-bone cyst, thrombosis, thrombotic brain ischemia, tissue ischemia, transient ischemic attack (TIA), traumatic brain injury, ulcerative colitis, vascular disease of the kidney, vascular inflammatory conditions, von Hippel-Lindau syndrome, or wounds to tissues or organs. The tissue is cardiac tissue and the cardiac is damaged as result of ischemia caused by acute myocardial infarction, myocardial infarction, cardiomyopathy, unstable angina, refractory angina, heart attack, heart failure, cor pulmonale, vein graft diseases, coronary heart diseases, occlusive coronary thrombus, valvular heart diseases, inflammatory cardiomegaly, atherosclerosis, acute pericarditis and Dresslers syndrome, inflammatory heart condition or a necrotizing heart condition. The subject may have myocardial ischemia, limb ischemia (CLI), myocardial ischemia, ischemic cardiomyopathy, cerebrovascular ischemia, renal ischemia, pulmonary ischemia, intestinal ischemia.

Another embodiment includes the protein or therapeutic or pyruvate kinase M2 as a dimer at a concentration greater than 1-3 µM. The dimeric form may be measured using techniques know or developed in the art. The monomer, dimer, and tetramer PKM2 can be measured by size exclusion chromatography or by fast protein liquid chromatography. The modified PKM2 proteins have a 10-fold greater dimer concentration than wild-type PKM2 proteins. In certain examples, the modified PKM2 proteins were stable and were almost entirely in the dimer form.

Another embodiment includes a polypeptide derived from PKM2 in which the polypeptide has at least 70% sequence identity to PKM2 that has three mutations at R399E, K422A, and N523A. The polypeptide may also have a 75%, 80%, 85%, 90%, 95%, and 99% or higher similarity to PKM2

Pyruvate Kinase

Pyruvate kinase isoform M2 (PKM2) is a pyruvate kinase isoform expressed in mammalian cells. Pyruvate kinase regulates the final rate-limiting event of glycolysis by catalyzing the transfer of a phosphate group from phosphoenolpyruvate to ADP to produce pyruvate and ATP. Among the 4 isoforms of pyruvate kinase, PKM1 and PKM2 are ubiquitously expressed in different types of cells and tissues. PKM2 is highly expressed in proliferating cells including cancer cells. Different from other isoforms, the expression and activity of PKM2 is regulated at multiple levels, including gene expression, alternative splicing, post-translational modification and by metabolic intermediates and growth signaling pathways. Hence, PKM2 is a unique multifaceted regulator that can improve cells adaptation in their metabolic program to match physiological needs in different environments.

In addition to regulating glycolysis, PKM2 has non-metabolic functions such as regulations on transcription process and cell cycle progression. In contrast to the mitochondrial respiratory reaction, energy regeneration by these pyruvate kinases is independent from oxygen supply and allows survival of the organs under hypoxic conditions. PKM2 may also act as a co-activator of hypoxia-induced factor 1-alpha (HIF-1α); the later behaves as a master transcription factor to regulate multiple signaling pathways in response to hypoxic insults. Increased levels and activities of PKM2 are associated with enhanced motility and metastasis of tumor cells; the molecular mechanism of the increased cell migration is so far poorly understood. It should be emphasized that increased aerobic glycolysis and cell proliferation or migration are not unique to cancer and malignancy but rather originate in normal biology and physiological development. In physiological proliferation of neural progenitors or under hypoxia, PKM2 helps to reprogram energy metabolism to support growth and adaptation. Thus, metabolic transformation is a co-opting of developmental episodes integral to physiological growth. Since these important metabolic and non-metabolic roles of PKM2 were mainly identified in cancerous tumor cells, their potential function in normal cells or in the response to ischemic episodes such as stroke or myocardial infarction is basically unknown.

Due to its increased expression and significant changes in cellular metabolism, PKM2 has been identified as a biomarker for tissue damage such as acute kidney injury. PKM2 can regulate gene transcription MEK5 by phosphorylating STAT3, which in turn activates numerous transcriptional factors to regulate cell proliferation, differentiation, migration, and survival. PKM2 greatly promotes tumorous angiogenesis through enhancing the endothelial cell migration and extracellular matrix attachment. PKM2 was recently found to be released by neutrophils at peripheral wound site and to facilitate early wound healing by promoting angiogenesis (see PCT/US13/31992). Whether PKM2 can be used as a therapeutic reagent to promote regeneration following ischemic tissue damage is not known.

The angiogenic activity and/or endothelial cell proliferative or migration potential of a pyruvate kinase M2, or a therapeutic substantially similar to pyruvate kinase, can be assessed by assays and methodology. The pyruvate kinase protein can be any vertebrate or mammalian pyruvate kinase, and may be a native pyruvate kinase, or a recombinant or other synthetic protein. The amino acid sequence for human pyruvate kinase is for instance provided by GenBank Accession No. MP0011193727 pyruvate kinase. The amino acid sequence identity of pyruvate kinase for example is highly conserved between species with human having 98% amino acid sequence identity with mouse, hamster, and rat. The amino acid sequence for human pyruvate kinase is disclosed herein (Example 1). In one specific embodiment, angiogenic active pyruvate kinase protein is a dimmer, that is, the subtype M2. A broad range of proteins and therapeutics substantially similar to pyruvate kinase M2 are useful with specific embodiments.

An animal from which native pyruvate kinase protein is purified can for instance be a member of the bovine, ovine, porcine, equine, canine, feline, primate, rodent or other mammalian family. In at least some forms, the pyruvate kinase protein will be a human pyruvate kinase protein purified from bacterial production. A recombinant pyruvate kinase protein can have an identical amino acid sequence to the native pyruvate kinase or one or more amino acid differences compared to the native protein. The amino acid changes can comprise the addition, deletion and/or substitution of one or more amino acids. Inversion of amino acids and other mutational changes that result in modification of the native pyruvate kinase protein sequence are also encompassed. Moreover, a recombinant protein can comprise an amino acid or amino acids not encoded by the genetic code.

The substitution of an amino acid can be a conservative or non-conservative substitution. The term conservative amino acid substitution is to be taken in the normally accepted sense of replacing an amino acid residue with another amino acid having similar properties, which does not have a substantial and adverse effect the angiogenic and/or wound healing activity of the pyruvate kinase protein. For example, a conservative amino acid substitution can involve substitution of a basic amino acid such as arginine with another basic amino acid such as lysine. Likewise, for instance a cysteine residue can be replaced with serine, or a non-polar amino acid may be substituted with another non-polar amino acid such as alanine. Amino acids amenable to substitution or deletion in a pyruvate kinase protein amino acid sequence may be determined by comparison of the sequence with closely related pyruvate kinase proteins to identify non-conserved amino acids and by routine trial and experimentation well within the skill of the addressee. A modified recombinant pyruvate kinase protein can be provided by introducing nucleotide change(s) in nucleic acid sequence encoding the native protein such that the desired amino acid changes are achieved upon expression of the nucleic acid in a host cell.

A recombinant or other synthetic pyruvate kinase protein useful in a method embodied by the invention will have amino acid sequence identity with the native pyruvate kinase of about 60% or greater, and, more commonly, at least about 70%, 80%, 90%, 95%, 98% or greater, or 100%. All sequence homologies and ranges thereof within those enumerated above are expressly encompassed. Sequence identity between amino acid sequences is determined by comparing amino acids at each position in the sequences when optimally aligned for the purpose of comparison. The sequences are considered identical at a position if the amino acids at that position are the same. A gap, that is a position in an alignment where an amino acid residue is present in one sequence but not the other, is regarded as a position with non-identical residues. Alignment of sequences may be performed using any suitable program or algorithm. Computer assisted sequence alignment can be conveniently performed using standard software programs.

The pyruvate kinase protein can also be chemically synthesized. The provision and use of fusion proteins incorporating a pyruvate kinase protein as described herein is also expressly encompassed by the invention. Nucleic acid encoding a fusion protein can be provided by joining separate DNA fragments encoding the pyruvate kinase protein and, for example, a lipophilic amino acid sequence for enhancing the lipophilic characteristics of the protein by employing blunt-ended termini and oligonucleotide linkers, digestion to provide staggered termini and ligation of cohesive ends as required.

Host cells that can be transfected for expression of recombinant pyruvate kinase proteins and fusion proteins as described herein include bacteria such as *E. coli*, *Bacillus* strains (eg., *B. subtilis*), *Streptomyces* and *Pseudomonas* bacterial strains, yeast such as *Saccharomyces* and *Pichia*, insect cells, avian cells and mammalian cells such as Chinese Hamster Ovary cells (CHO), COS, HeLa, HaRas, WI38, SW480, and NIH3T3 cells. The host cells are cultured in a suitable culture medium under conditions for expression of the introduced nucleic acid (typically in an appropriate expression vector) prior to purification of the expressed product from the host cells, and/or supernatants as required using standard purification techniques.

Pyruvate kinase proteins as described herein can also be modified by coupling one or more proteinaceous or non-proteinaceous moieties to the protein to improve solubility, lipophilic characteristics, stability, biological half-life, or for instance to act as a label for subsequent detection or the like. Modifications can also result from post-translational or post-synthesis modification such as by the attachment of carbohydrate moieties, or chemical reaction(s) resulting in structural modification(s) (e.g., the alkylation or acetylation of one or more amino acid residues or other changes involving the formation of chemical bonds). By way of a non-limiting example, the pyruvate kinase protein can have one or more modifications selected from the group consisting of methylation, phosphorylation, oxidation of tyrosine and/or tryptophan residues, glycosylation, and S-methylcysteine covalent attachment.

The pyruvate kinase protein can be of a size with a range of deviating from the complete protein. However, the pyruvate kinase should have a length sufficient to enable a dimmer formation.

Wound Healing

Tissue sites and wounds that may be treated in accordance with the invention include but are not limited to ischemic tissue including ischemic naturopathic foot ulcers, venous stasis ulcers, pressure sores, and hypoxic tissue. Examples of ischemic and hypoxic tissues include ischemic heart tissue, such as tissue following myocardial infarction, and hypoxic tissues associated with stroke. Conditions in which the wound healing process may be promoted by the administration of the pyruvate kinase protein include in circumstances of delayed wound healing in which healing is impaired or prevented by for example, tissue hypoxia, repeated trauma, or systemic causes such as diabetes and vascular disease. Examples of endothelial cell types that may be induced to proliferate and/or migrate by pyruvate kinase proteins in accordance with the invention include human umbilical vein endothelial cells, human microvascular endothelial cells, and aorta endothelial cells.

Angiogenesis/Stem Cell Proliferation

The pyruvate kinase protein can be administered to a subject so to stabilize stems cells and tissue cultures within the subject. By administrating the protein, the culture or cells may undergo angiogenesis.

In one specific embodiment, stem cells can be treated with a pyruvate kinase protein so to facilitate blood vessel to the transplanted stem cells, so to promote survival of the stem cells. The source of the stem cells may be adipose stromal cells, embryonic stem cells, and/or stem cells derived from bone marrow aspirate. The stem cells can be mammalian stem cells, and in various embodiments, are human stem cells. Stem cells can be applied to the site just prior to the administration of the pyruvate kinase protein, and can be mixed with stem cells for co-transplantation.

In another embodiment, tissue transplantation may be facilitated by the treatment of the transplanted tissue with protein substantially similar to pyruvate kinase. The transplanted tissue may be treated with pyruvate kinase protein.

A scaffold may be included to contain, support, or retain the pyruvate kinase protein, along with other materials, at the tissue defect site. In one example, a scaffold may contain or support stem cells to enabling growth and/or retention of the stem cells at the site of implantation. In addition, the scaffold may facilitate migration of endogenous cells into the administration site. The scaffold may be implanted or applied at the tissue defect site, followed by the administration of the pyruvate kinase protein. One example includes a method for facilitating tissue transplantation and cell transplantation contacting a site of transplantation with a protein substantially similar to pyruvate kinase M2. In some examples, the cells to be transplanted can be mixed with a protein substantially similar to pyruvate kinase.

Pyruvate Kinase Administration

The pyruvate kinase protein can be administered to a subject in need of such treatment alone or be co-administered with one or more other therapeutic agents. For example, pyruvate kinase can be co-administered in combination with therapeutic agents conventionally used for promoting angiogenesis, cellular proliferation, or wound healing. By "co-administered" is meant simultaneous administration in the same formulation or in two different formulations by the same or different routes, or sequential administration by the same or different routes, whereby the pyruvate kinase protein and other therapeutic agent(s) exhibit overlapping therapeutic windows. By "sequential" administration is meant one is administered after the other. Such further agents that may be co-administered with the pyruvate kinase protein include platelet-derived growth factor (PDGF), transforming growth factor-.beta. (TGF-β), platelet-derived wound healing factor, insulin growth factor (IGF), keratinocyte growth factor (KGF), anti-inflammatory agents and anti-microbial agents. Further examples of other therapeutic agents used for promoting angiogeneisis and/or wound healing that may be co-administered with the pyruvate kinase protein include indoleamine 2,3-dioxygenase (IDO), tryptophan dioxygenase (TDO), spingosine-1-phosphate (SIP), N-acylethanolamines, grapefruit extract and other plant phytochemicals including ascein, green tea catechins, melatonin, arginine and other amino acids for support of vessel growth. Additional therapeutic agents appropriate for co-administration will be obvious to those of ordinary skill in the art.

The pyruvate kinase protein will generally be formulated into a pharmaceutical composition comprising the protein and a pharmaceutically acceptable carrier.

A pharmaceutical composition as described herein can also incorporate one or more preservatives such as parabens, chlorobutanol, and sorbic acid, binders such as corn starch or gelatin, thickening agents, emulsifiers, surfactants, gelling agents, and other components typically used in such compositions. Pharmaceutically acceptable carriers include any suitable conventionally known physiologically acceptable solvents, dispersion media, isotonic preparations and solutions. Use of such ingredients and media for pharmaceutically active substances is well known. Except insofar as any conventional media or agent is incompatible with the pyruvate kinase protein, use thereof is expressly encompassed.

Pharmaceutical compositions embodied by the invention include therapeutic compositions for human or veterinary use.

A pharmaceutical composition embodied by the invention will generally contain at least about 0.001% by weight of the pyruvate kinase protein up to about 80% w/w of the composition. For example, the pharmaceutical composition can contain about 0.05%, 0.01%, 0.1%, 1%, 10%, 20%, 30%, 40%, 50%, 60%, 70%, or 80% by weight of the pyruvate kinase protein or substantially similar therapeutic. The amount of the protein in the composition will be such that a suitable effective dosage will be delivered to the subject taking into account the proposed mode of administration.

The dosage of the pyruvate kinase protein administered in accordance with an embodiment of the invention will depend on a number of factors including whether the protein is to be administered for prophylactic or therapeutic use, the disease or condition for which the protein is intended to be administered, the severity of the condition, the sex and age of the subject, and related factors including weight and general health of the subject, and can be determined in accordance with accepted medical principles. For instance, a low dosage can initially be given which is subsequently increased at each administration following evaluation of the subject's response. Similarly, the frequency of administration can be determined in the same way that is, by continuously monitoring the subject's response between each dosage and if desirable, increasing the frequency of administration or alternatively, reducing the frequency of administration.

Routes of administration include but are not limited to topically, respiratorialy, intravenously, intranasal, orally, intraperitonealy, subcutaneously, intramuscularly, rectally and by implant. With respect to intravenous routes, particularly suitable routes are via injection into blood vessels which supply the target tissue to be treated. The pyruvate kinase protein can also be delivered into cavities such for example the pleural or peritoneal cavity, cranial or be injected directly into the tissues to be treated. For oral administration, the pyruvate kinase protein can be encapsulated or otherwise provided in an enteric for passage through the stomach and release in the small intestine. Any suitable such enteric formulation or coating can be utilized. Furthermore, these systems and methods may be practiced using any mode of administration that is medically acceptable, meaning any mode that produces effective levels of cellular regeneration or tissue repair without causing clinically unacceptable adverse effects.

Moreover, a pyruvate kinase protein can also be coated onto the surface of a stent or balloon of a catheter such as an angioplasty catheter, or other surgical instrument for application to the interior wall of a blood vessel during angioplasty or other surgical procedure. The pyruvate kinase can for instance be applied to the wall of the blood vessel in this manner in the form of a gel or any other appropriate formulation to promote wound healing and/or angiogenesis, epithelial cell migration, or cellular regeneration at the site of treatment.

Suitable pharmaceutically acceptable carriers and formulations useful in compositions embodied by the invention can for instance be found in handbooks and texts.

Pharmaceutic Agents, Kits, and Embodiments

Pharmaceutical agents include the following categories and specific examples. It is not intended that the category be limited by the specific examples. Those of ordinary skill in the art will be able to identify readily those pharmaceutical agents that have utility within or outside of the central nervous system. Those of ordinary skill in the art will recognize also numerous other compounds that fall within the categories and that are useful according to the invention.

One embodiment also includes a kit for improving recovery following an ischemic episode or series of ischemic episodes. The combination of agents is provided to allow administration in an amount and frequency therapeutically effective to produce cellular regeneration following an ischemic episode.

In some embodiments, it may be desired to increase the solubility and blood circulation time of the PKM2 or a substantially similar therapeutic. To increase polypeptide solubility, blood circulation time, polyethylene glycol may be used to derivatize polypeptides of the invention, include, for example, poly(ethylene glycol) (PEG), poly(vinylpyrrolidone), polyoxomers, polysorbate and poly(vinyl alcohol), with PEG polymers being particularly preferred. The PEG polymers are PEG polymers having a molecular weight of from about 100 to about 40,000. Other suitable hydrophilic polymers, in addition to those exemplified above, will be readily apparent to one skilled in the art based on the present disclosure. Generally, the polymers used may include polymers that can be attached to the polypeptides of the invention via alkylation or acylation reactions. In one example, the PKM2 or a substantially similar therapeutic was PEGylated with a PEG-chain of 20 kDa.

When attaching polyethylene glycol molecules (or other chemical moieties) to a polypeptide consideration should be given to the effects on functional or antigenic domains of the polypeptide. There are a number of attachment methods available to those skilled in the art. For example, polyethylene glycol may be covalently bound through amino acid residues via a reactive group, such as, a free amino or carboxyl group. Reactive groups are those to which an activated polyethylene glycol molecule may be bound. The amino acid residues having a free amino group may include lysine residues and the N-terminal amino acid residues; those having a free carboxyl group may include aspartic acid residues glutamic acid residues and the C-terminal amino acid residue. Sulfhydryl groups may also be used as a reactive group for attaching the polyethylene glycol molecules. Preferred for therapeutic purposes is attachment at an amino group, such as attachment at the N-terminus or lysine group. One may specifically desire polypeptides chemically modified at the N-terminus. Using polyethylene glycol as an illustration of the present composition, one may select from a variety of polyethylene glycol molecules (by molecular weight, branching, etc.), the proportion of polyethylene glycol molecules to polypeptide (polypeptide) molecules in the reaction mix, the type of pegylation reaction to be performed, and the method of obtaining the selected N-terminally pegylated polypeptide. Under the appropriate reaction conditions, substantially selective derivatization of the polypeptide at the N-terminus with a carbonyl group containing polymer is achieved.

Certain specific embodiments also provide pharmaceutical compositions. Such compositions comprise a therapeutically effective amount of active component (e.g. PKM2 or a substantially similar therapeutic), and a pharmaceutically acceptable carrier. Such pharmaceutical carriers can be sterile liquids, such as water and oils, including those of petroleum, animal, vegetable or synthetic origin, such as peanut oil, soybean oil, mineral oil, sesame oil and the like. Water is a carrier when the pharmaceutical composition is administered intravenously. Saline solutions and aqueous dextrose and glycerol solutions can also be employed as liquid carriers, particularly for injectable solutions. Suitable pharmaceutical excipients include starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol and the like. The composition, if desired, can also contain minor amounts of wetting or emulsifying agents, or pH buffering agents. These compositions can take the form of solutions, suspensions, emulsion, tablets, pills, capsules, powders, sustained-release formulations and the like. The composition can be formulated as a suppository, with traditional binders and carriers such as triglycerides. Oral formulation can include standard carriers such as pharmaceutical grades of mannitol, lactose, starch, magnesium stearate, sodium saccharine, cellulose, magnesium carbonate, etc. Such compositions will contain a therapeutically effective amount of the PKM2 or a substantially similar therapeutic together with a suitable amount of carrier so as to provide the form for proper administration to the patient. The formulation should suit the mode of administration.

The amount of the PKM2 or a substantially similar therapeutic that will be effective in assisting with recovery from an ischemic episode can be determined by standard clinical techniques. In addition, in vitro assays may optionally be employed to help identify optimal dosage ranges. The precise dose to be employed in the formulation will also depend on the route of administration, and the seriousness of the disease or disorder, and should be decided according to the judgment of the practitioner and each patient's circumstances. Effective doses may be extrapolated from dose-response curves derived from in vitro or animal model test systems.

More specifically, the agent or pharmaceutical compositions can be tested in vitro, and then in vivo for the desired therapeutic or prophylactic activity, prior to use in humans. For example, in vitro assays to demonstrate the therapeutic or prophylactic utility of a compound or pharmaceutical composition include the effect of a compound on a cell line or a patient tissue sample. The effect of the compound or composition on the cell line and/or tissue sample can be determined utilizing techniques known to those of skill in the art including, but not limited to, rosette formation assays and cell lysis assays. In accordance with the invention, in vitro assays which can be used to determine whether administration of a specific compound is indicated, include in vitro cell culture assays in which a patient tissue sample is grown in culture, and exposed to or otherwise administered a compound, and the effect of such compound upon the tissue sample is observed.

It is contemplated that the PKM2 or a substantially similar therapeutic can be formulated in accordance with routine procedures as a pharmaceutical composition adapted for intravenous administration to human beings. Typically, compositions for intravenous administration are solutions in sterile isotonic aqueous buffer. Where necessary, the composition may also include a solubilizing agent and a local anesthetic such as lignocaine to ease pain at the site of the injection. Generally, the ingredients are supplied either separately or mixed together in unit dosage form, for example, as a dry lyophilized powder or water free concentrate in a hermetically sealed container such as an ampoule or sachette indicating the quantity of active agent. Where the composition is to be administered by infusion, it can be dispensed with an infusion bottle containing sterile pharmaceutical grade water or saline. Where the composition is administered by injection, an ampoule of sterile water for injection or saline can be provided so that the ingredients may be mixed prior to administration.

Various delivery systems are known and can be used to administer a compound of the invention, e.g., encapsulation in liposomes, microparticles, microcapsules, recombinant cells capable of expressing the compound, receptor-mediated endocytosis, construction of a nucleic acid as part of a retroviral or other vector, etc. Methods of introduction include but are not limited to intradermal, intramuscular, intraperitoneal, intravenous, subcutaneous, intranasal, epidural, and oral routes. The compounds or compositions may be administered by any convenient route, for example by infusion or bolus injection, by absorption through epithelial or mucocutaneous linings (e.g., oral mucosa, rectal and intestinal mucosa, etc.) and may be administered together with other biologically active agents. Administration can be systemic or local. In addition, it may be desirable to introduce the pharmaceutical compounds or compositions of the invention into the central nervous system by any suitable route, including intraventricular and intrathecal injection; intraventricular injection may be facilitated by an intraventricular catheter.

In a specific embodiment, it may be desirable to administer the PKM2 or a substantially similar therapeutic locally to the area in need of treatment. This may be achieved by, for example, and not by way of limitation, local infusion during surgery, by injection, by means of a catheter, by means of a suppository, or by means of an implant, said implant being of a porous, non-porous, or gelatinous material, including membranes, such as sialastic membranes, or fibers. When administering a polypeptide, care should be taken to use materials to which the polypeptide does not absorb.

One specific embodiment provides stents, comprising a generally tubular structure (which includes for example, spiral shapes), the surface of which is coated with PKM2 or a substantially similar therapeutic as described above. A stent can be a scaffolding, usually cylindrical in shape, that may be inserted into a body passageway (e.g., bile ducts, arteries, veins) or a portion of a body passageway, which has been narrowed, irregularly contoured, obstructed, or occluded by a disease process (e.g., ingrowth by a tumor) in order to prevent closure or reclosure of the passageway.

One specific embodiment also provides use of PKM2 or a substantially similar therapeutic in a wide variety of surgical procedures. For example, surgical meshes which have been coated with PKM2 may be utilized in any procedure wherein a surgical mesh might be utilized.

Focal Ischemic Stroke Model of Mice

C57BL/6 (24-28 g, 9-13 weeks old) mice were housed at 21-22° C. room temperature with a 12 hr light/dark cycle in the pathogen-free Laboratory Animal Center for Research at Emory University. Occlusions of the right middle cerebral artery (MCA) were performed. Briefly, animals were subjected to ketamine/xylazine (ketamine 80-100 mg/kg i.p., xylazine 10-12.5 mg/kg i.p.) anesthesia, and the right MCA was permanently ligated by a 10-0 suture (Surgical Specialties CO., Reading, PA, USA). The creation of the barrel cortex ischemic region was completed by bilateral occlusion of the common carotid arteries (CCA) for 7 min followed by reperfusion. During surgery and recovery periods, body temperature was monitored and maintained at 37.0±0.5° C. using a temperature control unit and heating pads. Intranasal administration has been proven a noninvasive method with great clinical relevance to deliver protein, neuropeptides and even cells into the brain by utilizing the olfactory neuronal distribution pathways in the cribriform plate, which bypasses the blood-brain barrier (BBB), and directly guides therapeutics from nose to brain tissues. In the present example, recombinant PKM2 (rPKM2) was delivered to the ischemic brain of mice using the intranasal method for clinical feasibility. We tested the possibility that PKM2 downstream signals involving cell survival and regeneration such as STAT3 and regenerative factors were potential contributors in PKM2's effects.

Drug Administration in Mice

The recombinant pyruvate kinase M2 (rPKM2) was produced by Dr. Zhi-Ren Liu's group according to the published protocol (Li et al., 2014; Zhang et al., 2016). rPKM2 (160 µg/kg) was administrated intranasally according to established procedures every other day starting 24 hrs after stroke until animals were sacrificed. To label proliferating cells, 5-bromo-2'-deoxyuridine (BrdU) (Sigma, St Louis, MO) was administrated to all animals (50 mg/kg/day, intraperitoneal injection) beginning on Day 3 after stroke and continued once daily until sacrifice. The STAT3 inhibitor XVIII, BP-1-102 (3 mg/kg, Millipore, Billerica, MA) was administered orally once daily. Saline was used as vehicle control of drug treatments.

Local Cerebral Blood Flow (LCBF) Measurement

Laser scanning imaging was used to measure LCBF at three time points: immediately before MCA ligation, during the 7 min bilateral common carotid artery ligation and 14 days after ischemia. Briefly, animals were anesthetized with an injection of 4% chloral hydrate solution and an incision was made to expose the skull above the territory of the right MCA. The laser was centered over the right coronal suture. Different from the conventional Laser Doppler probe that measures a small point of blood flow, the scanner method measures a 2.4×2.4 mm square area using the Laser Doppler perfusion imaging system (PeriFlux System 5000-PF5010 LDPM unit, Perimed, Stockholm, Sweden). This scanning measurement largely avoids inaccurate or bias results caused by inconsistent location of the laser prob. Data was analyzed using the LDPI Win 2 software (Perimed AB, Stockholm, Sweden).

Adhesive Removal Test

The adhesive removal test measures sensorimotor function. A small adhesive dot was placed on each forepaw, and the amount of time (seconds) needed to contact and remove the sticker from each forepaw was recorded. Recording stopped if the animal failed to contact the sticker within 2 min. Mice were trained three times before stroke surgery to ensure that they were able to remove the tape. The test was performed three times per mouse, and the average time was used in the analysis at before stroke and 14 days after stroke.

Isolation and Culture of Mouse Neural Progenitor Cells (NPCs)

NPCs were isolated from C57/BL6 mice and cultured as previously described protocol (Gu et al., 2013). Briefly, the tissue from the SVZ of postnatal day 1-3 (P1-13) mice was isolated and dissociated to single cell suspension. Cells were then plated in culture medium, containing DMEM and Ham's F12 medium (DMEM/F12, 1:1) (Invitrogen, Carlsbad, CA, USA) supplement with 2% B27 (Invitrogen), 20 ng/mL epidermal growth factor (EGF) (Invitrogen) and 20 ng/Ml basic fibroblast growth factor (bFGF) (Invitrogen). Five to seven days after plating, neurospheres were mechanically split and plated in the same medium with 1:3 ratios. Passage 2-4 NSCs were used in the present disclosure.

Mouse Embryonic Fibroblasts (MEFs) Cell Cultures

FAK wild-type ($FAK^{+/+}$) and FAK knock-out ($FAK^{-/-}$) MEFs cell lines were generated in our lab (Wei et al., 2008). Cells were cultured in DMEM medium (Invitrogen) supplemented with 10% FBS (Sigma).

EXAMPLES

Example 1

The following is an exemplary pyruvate kinase M2 amino acid sequence or SEQ ID NO: 1:

```
PKM2 Accession No. NP 002645
  1 mskphseagt afiqtqqlha amadtflehm crldidsppi tarntgiict igpasrsvet
 61 lkemiksgmn varlnfshgt heyhaetikn vrtatesfas dpilyrpvav aldtkgpeir
121 tglikgsgta evelkkgatl kitldnayme kcdenilwld yknickvvev gskiyvddgl
181 islqvkqkga dflvteveng gslgskkgvn lpgaavdlpa vsekdiqdlk fgveqdvdmv
241 fasfirkasd vhevrkvlge kgknikiisk ienhegvrrf deileasdgi mvargdlgie
301 ipaekvflaq kmmigrcnra gkpvicatqm lesmikkprp traegsdvan avldgadcim
361 lsgetakgdy pleavrmqhl iareaeaaiy hlqlfeelrr lapitsdpte atavgaveas
421 fkccsgaiiv ltksgrsahq varyrprapi iavtrnpqta rqahlyrgif pvlckdpvqe
481 awaedvdlrv nfamnvgkar gffkkgdvvi vltgwrpgsg ftntmrvvpv p
```

Example 2

The following are the amino acid sequences of modified pyruvate kinase proteins in which at least arginine has been substituted with a glutamate or SEQ ID NO.: 2 and SEQ ID NO. 3, respectively.

```
R399E Mutant
  1 mskphseagt afiqtqqlha amadtfelhm crldidsppi tarntgiict igpasrsvet
 61 lkemiksgmn varlnfshgt heyhaetikn vrtatesfas dpilyrpvav aldtkgpeir
121 tglikgsgta evelkkgatl kitldnayme kcdenilwld yknickvvev gskiyvddgl
181 islqvkqkga dflvteveng gslgskkgvn lpgaavdlpa vsekdiqdlk fgveqdvdmv
241 fasfirkasd vhevrkvlge kgknikiisk ienhegvrrf deileasdgi mvargdlgie
301 ipaekvflaq kmmigrcnra gkpvicatqm lesmikkprp traegsdvan avldgadcim
361 lsgetakgdy pleavrmqhl iareaeaaiy hlqlfeeler lapitsdpte atavgaveas
421 fkccsgaiiv ltksgrsahq varyrprapi iavtrnpqta rqahlyrgif pvlckdpvqe
481 awaedvdlrv nfamnvgkar gffkkgdvvi vltgwrpgsg ftntmrvvpv p Y105E Mutant
  1 mskphseagt afiqtqqlha amadtfelhm crldidsppi tarntgiict igpasrsvet
 61 lkemiksgmn varlnfshgt heyhaetikn vrtatesfas dpilerpvav aldtkgpeir
121 tglikgsgta evelkkgatl kitldnayme kcdenilwld yknickvvev gskiyvddgl
181 islqvkqkga dflvteveng gslgskkgvn lpgaavdlpa vsekdiqdlk fgveqdvdmv
241 fasfirkasd vhevrkvlge kgknikiisk ienhegvrrf deileasdgi mvargdlgie
301 ipaekvflaq kmmigrcnra gkpvicatqm lesmikkprp traegsdvan avldgadcim
361 lsgetakgdy pleavrmqhl iareaeaaiy hlqlfeelrr lapitsdpte atavgaveas
421 fkccsgaiiv ltksgrsahq varyrprapi iavtrnpqta rqahlyrgif pvlckdpvqe
481 awaedvdlrv nfamnvgkar gffkkgdvvi vltgwrpgsg ftntmrvvpv p
```

Example 3

In vivo tests supported that PKM2 is expressed in both the brains of normal mice and the brains of mice that underwent the focal ischemic stroke model. Furthermore, intranasal administration of rPKM2 increased phosphorylation of STAT 3 in stroke mice. PKM2 expression was determined via western blot analysis in mouse sham control brains and in mouse brains following ischemic stroke. As shown in FIG. 1A, a basal level of PKM2 expression was seen in the control brain, while focal cerebral ischemia transiently increased the PKM2 level in the peri-infarct region at 1 day after the ischemic insult. The PKM2 level then gradually declined to lower levels at 3 and 7 days after stroke.

Exogenous rPKM2 was administered to prevent the decline of PKM2 in the post-stroke brain. Stroke mice received intranasally delivered rPKM2 (160 ng/kg per day) from 1 day after stroke. As shown in FIG. 1B, seven days after stroke, the PKM2 level in the peri-infarct region of the ischemic cortex remained significantly higher than that in the stroke control.

In FIGS. 1C-1E, western blot analysis showed that, 7 and 14 days after stroke, animals that received the rPKM2 treatment had significantly higher levels of phosphorylated STAT3 (pSTAT3). BP-1-102 is a STAT3 inhibitor that suppresses the phosphorylation of STAT3. In stroke animals received PKM2 and BP-1-102 (3 mg/kg/day, o.g.), the level of pSTAT3 in the peri-infarct region at 7 and 14 days after stroke was significantly lower than that in animals received rPKM2 treatment alone (FIG. 1C-1E).

Example 4

Figure 2:
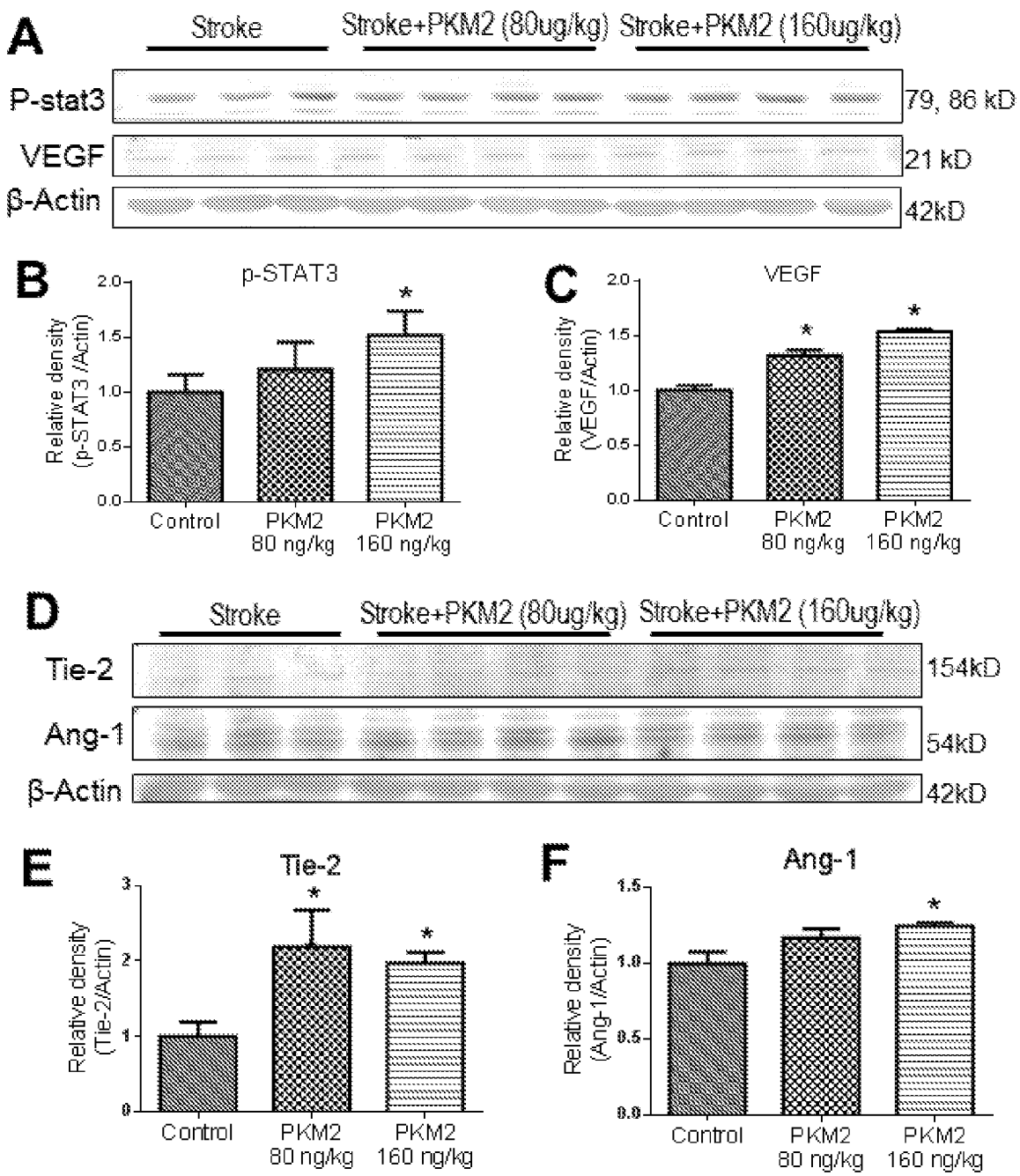
FIG. 2A provides a western blot image showing the dose-dependent effect of PKM2 administration on expression of P-STAT3 and VEGF following focal ischemic stroke.
FIG. 2B provides a graphical representation of the western blot data showing of the dose-dependent effect of PKM2 administration on expression of P-STAT3 following focal ischemic stroke.
FIG. 2C provides a graphical representation of the western blot data showing of the dose-dependent effect of PKM2 administration on expression of VEGF following focal ischemic stroke.
FIG. 2D provides a western blot image showing the dose-dependent effect of PKM2 administration on expression of Tie-2 and Ang-1 following focal ischemic stroke.
FIG. 2E provides a graphical representation of western blot data showing of the dose-dependent effect of PKM2 administration on expression of Tie-2 following focal ischemic stroke.
FIG. 2F provides a graphical representation of the western blot data showing of the dose-dependent effect of PKM2 administration on expression of Ang-1 following focal ischemic stroke.

The in vivo effect of PKM2 on STAT3 showed a dose-dependent response. As shown in FIGS. 2A and 2B, reducing rPKM2 to 80 ng/kg did not cause a significant increase in p-STAT3. Meanwhile, as shown in FIGS. 2A, 2C and 2D-2F, the rPKM2 treatment showed a dose-dependent up-regulation on the angiogenic factors VEGF, Tie-2 and Ang-1. Based on above observations, the rPKM2 dosage of 160 ng/kg was selected to test in Examples 5, and 8-10.

Example 5

Figure 3:
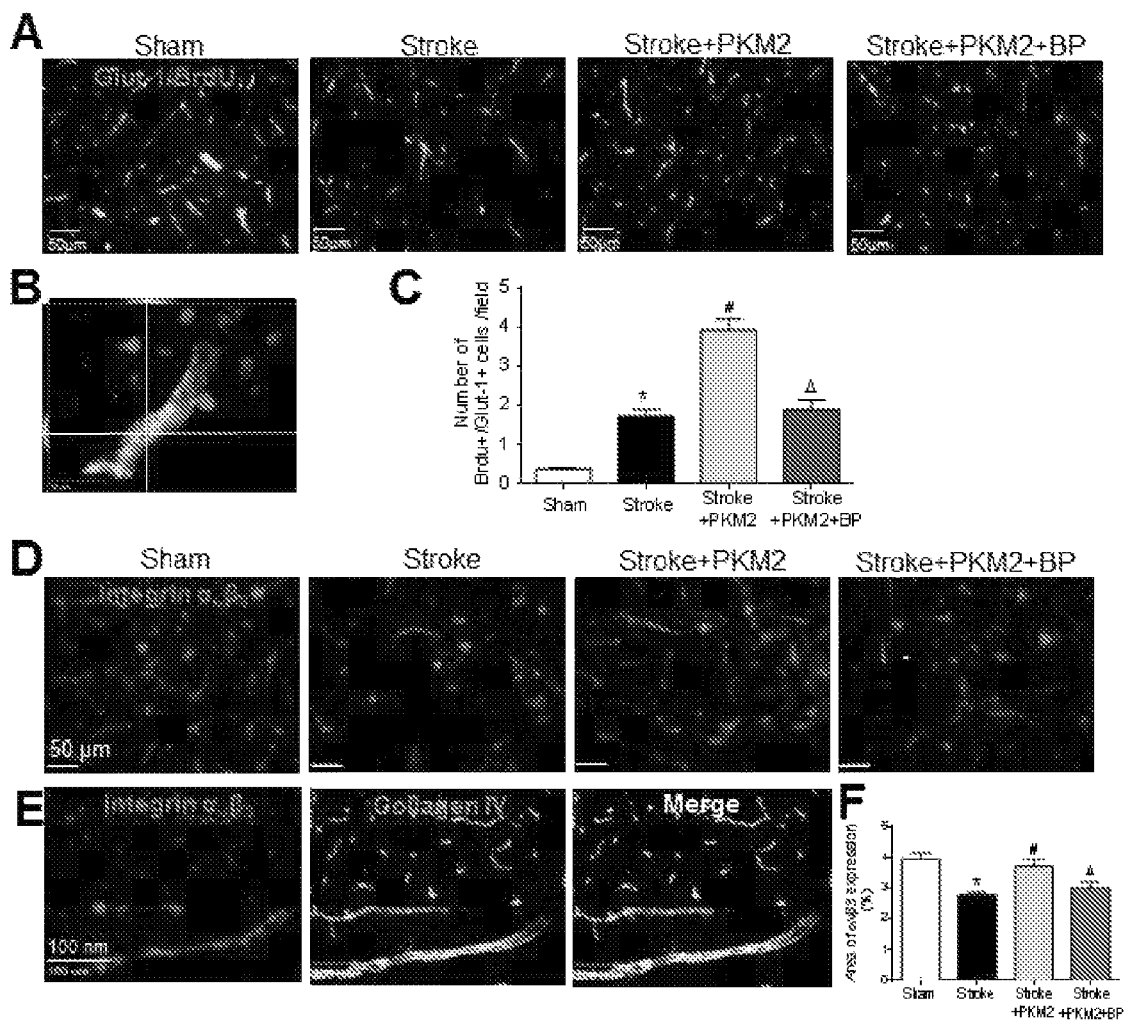
FIG. 3A provides representative immunohistochemistry images that show the effect of PKM2 administration and PKM2/BP administration on angiogenesis, as indicated by Glut-1 and BrdU expression, 14 days after ischemic stroke.
FIG. 3B provides a representative immunohistochemistry image that shows co-localization of Glut-1 and BrdU to indicate proliferating or growing vessels.
FIG. 3C provides a graphical representation that shows the effect of PKM2 administration and PKM2/BP administration on angiogenesis, as indicated by Glut-1 and BrdU co-localization, 14 days after ischemic stroke.
FIG. 3D provides representative immunohistochemistry images that show the effect of PKM2 administration and PKM2/BP administration on angiogenesis, as indicated by Integrin $\alpha_v\beta_3$ expression, 14 days after ischemic stroke.
FIG. 3E provides representative immunohistochemistry images showing expression and co-localization of $\alpha_v\beta_3$ and Collagen IV.
FIG. 3F provides graphical representation of immunohistochemistry data that shows the effect of PKM2 administration and PKM2/BP administration on angiogenesis, as indicated by Integrin $\alpha_v\beta_3$ expression, 14 days after ischemic stroke.

In vivo tests supported that rPKM2 treatment promoted the angiogenesis after ischemic stroke through activation of STAT3 signaling. In the mouse focal ischemic stroke model, BrdU (50 mg/kg, i.p.) was injected to label the proliferating cells in the mouse. Immunohistochemistry staining of the blood vessel marker Glut-1 and BrdU on brain sections was performed 14 days after stroke. The co-label Glut-1 and BrdU indicated proliferating or growing vessels. As shown in FIGS. 3A-3C, there were more Glut-1/BrdU co-labeled cells in the peri-infarct region 14 days after stroke compared to that in sham control animals, suggesting increased angiogenic activity after stroke. Also in FIGS. 3A-3C, stroke animals that received rPKM2 treatment showed much greater number of Glut-1/BrdU co-labeled cells in the peri-infarct region compared to those of stroke vehicle controls.

As shown in FIG. 3C, the STAT3 inhibitor BP-1-102 significantly reduced the number of Glut-1/BrdU co-labeled cells and Glut-1 positive vessels in the peri-infarct region 14 days after stroke compared to stroke animals received rPKM2. These data support that that the promoting effect of PKM2 on angiogenesis was largely mediated by the STAT3 signaling.

Since the integrin $\alpha_v\beta_3$ is expressed on endothelial cells and plays an important responding role during angiogenesis process, the effect of the rPKM2 treatment on integrin $\alpha_v\beta_3$ expression after stroke was examined. As shown in FIG. 3E, immunostaining imaging 14 days after stroke showed overlaid expression of integrin $\alpha_v\beta_3$ and Collagen IV. The integrin $\alpha_v\beta_3$ positive area in stroke animals was lower in the peri-infarct region compared with animals in sham group. As shown in FIGS. 3D and 3F, rPKM2 treatment restored the level of integrin $\alpha_v\beta_3$ in stroke animals. Inhibiting STAT3 with BP-1-102 blocked the effect of PKM2.

Example 6

Figure 4:
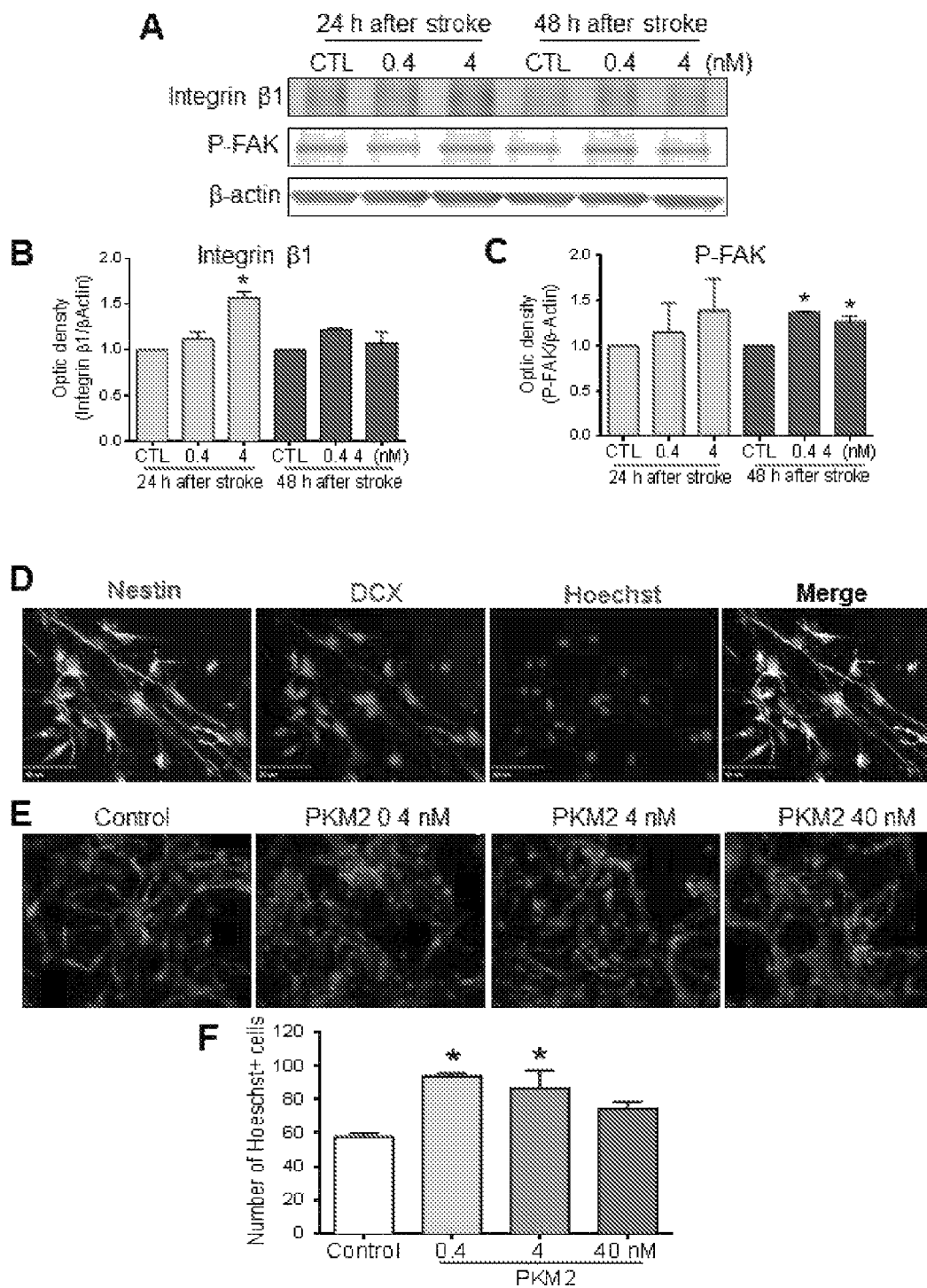
FIG. 4A provides a representative western blot image showing the effect of PKM2 administration on expression of integrin $\beta 1$ and phosphorylated focal adhesive kinase (P-FAK) following focal ischemic stroke.
FIG. 4B provides a graphical representation of western blot data showing the effect of PKM2 administration on expression of integrin $\beta 1$ following focal ischemic stroke.
FIG. 4C provides a graphical representation of western blot data showing the effect of PKM2 administration on expression of P-FAK following focal ischemic stroke.
FIG. 4D shows immunochemistry labeling of Nestin, doublecortin (DCX), and Hoechst in neural progenitor cells (NPCs) isolated from the brain of C57/BL6 mouse pups.
FIG. 4E provides immunochemistry labeling of NPCs that migrated to the bottom chamber in the transwell assay of directed migration.
FIG. 4F provides a graphical representation of the effect of PKM2 administration on migration of number of Hoeschst cells to the bottom chamber in the transwell assay of directed migration.
Figure 7:
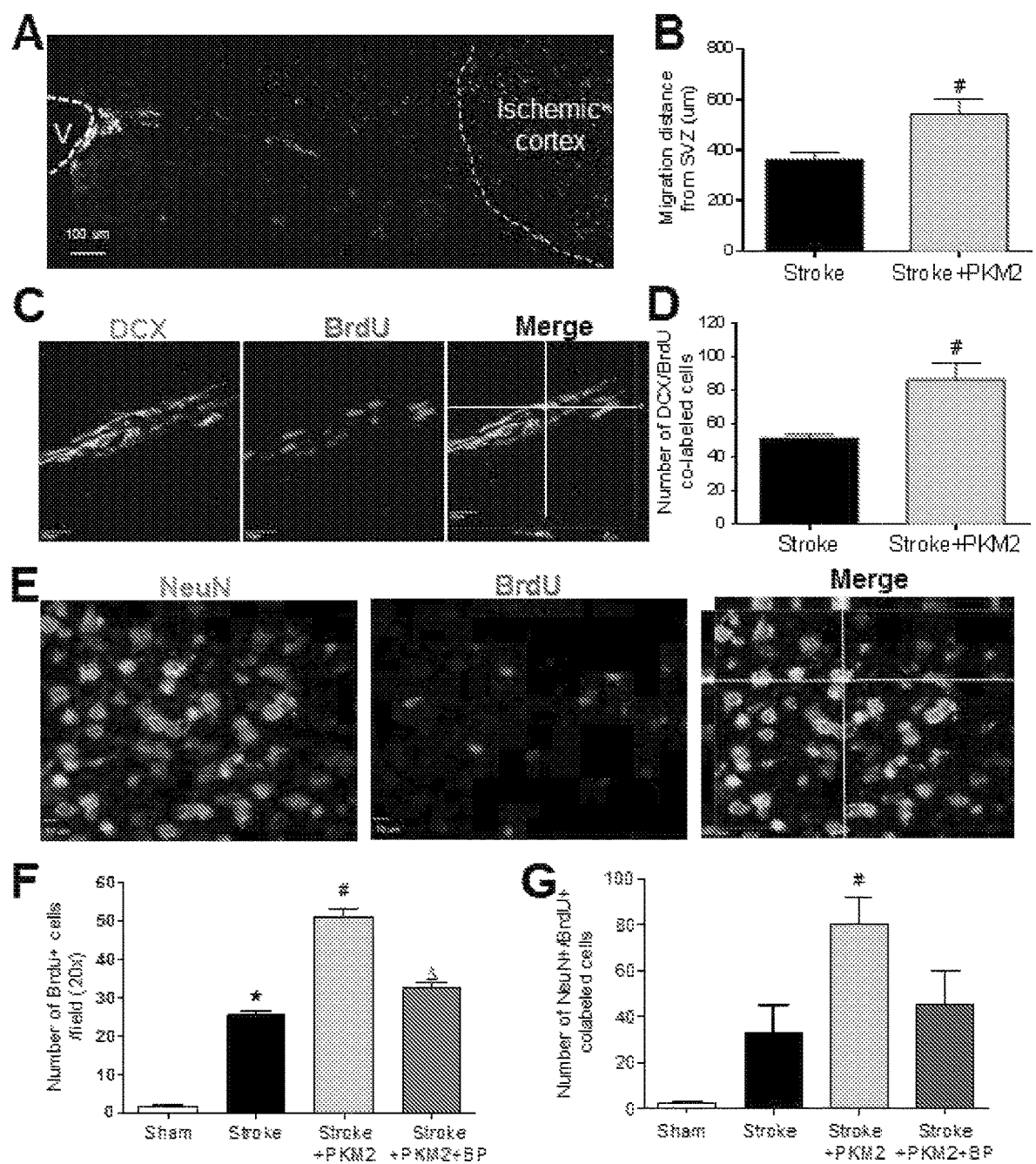
FIG. 7A is an immunocytochemistry image showing DXC/Brdu co-labeled cells along the migrating track from the ipsilateral SVZ to the ischemic cortex 14 days after focal ischemic stroke.
FIG. 7B provides a graphical representation showing the effect of PKM2 administration on migration distance of neuroblasts from the SVZ at 14 days after focal ischemic stroke.
FIG. 7C provides immunocytochemistry images showing the effect of PKM2 treatment on the number of DCX/BrdU co-labeled cells following stroke.
FIG. 7D provides a graphical representation of immunocytochemistry data showing the effect of PKM2 treatment on the number of DCX/BrdU co-labeled cells following stroke.
FIG. 7E provides immunocytochemistry images showing NeuN and BrdU and Neun/BrdU co-labelled cells at 14 days after stroke.
FIG. 7F is a graphical representation of the effect of PKM2 and PKM2/BP administration on the number of Brdu positive cells following stroke.
FIG. 7G is a graphical representation of the effect of PKM2 and PKM2/BP administration on the number of NeuN/Brdu co-labeled cells following stroke.

STAT3 signaling plays a critical role in neurogenesis including neuroblast migration and neuronal differentiation in the central nervous system (CNS). The integrins and focal adhesive kinase (FAK) are key molecules in cell migration. The present in vitro studies show that rPKM2 increased migration factors and promoted neural progenitor cell migration. These studies analyzed the effect of rPKM2 on the expression of integrin β1 and activation/phosphorylation of FAK in neural progenitor cells (NPCs) isolated from the brain of C57/BL6 mouse P1-3 pups. As shown in FIGS. 7A-4C, western blotting revealed that the level of Integrin β1 in NPCs increased 24-hr after 4 nM rPKM2 treatment. Moreover, phosphorylated FAK was increased by the rPKM2 treatment 48 hrs after adding rPKM2 (0.4 and 4 nM).

The effect of rPKM2 on cell migration was next tested in NPC cultures. As shown in FIG. 4D, immunochemistry staining verified that NPCs showed Nestin and doublecortin (DCX) expression. In the transwell assay of directed migration in response to the chemoattractant SDF-1 placed on the bottom chamber, rPKM2 (0.4 nM and 4 nM) pre-treatment for 48 hrs significantly increased the number of NPCs migrated to the bottom membrane of inserts (FIGS. 4E and 4F).

Example 7

Figure 5:
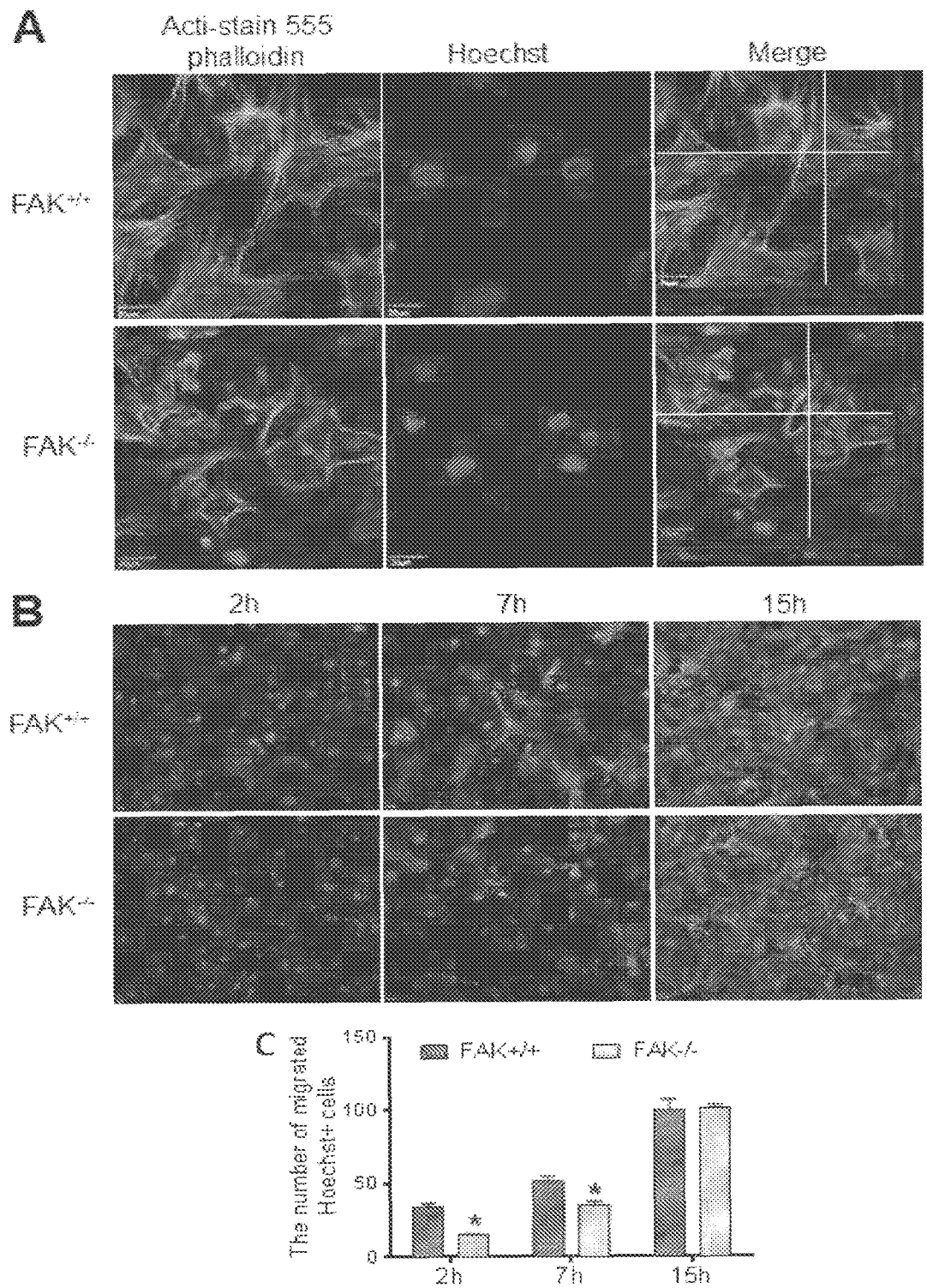
FIG. 5A shows immunocytochemistry staining of the cytoskeleton marker Acti-stain 555 phalloidin in $FAK^{+/+}$ or $FAK^{-/-}$ mouse embryonic fibroblasts (MEFs).
FIG. 5B shows immunocytochemistry images of the migration of $FAK^{+/+}$ or $FAK^{-/-}$ MEFs in the transwell migration assay.
FIG. 5C shows a graphical representation of the migration of $FAK^{+/+}$ or $FAK^{-/-}$ MEFs in the transwell migration assay.

In vitro studies show that FAK plays an important mediator role in the effect of rPKM2 on cell migration. rPKM2 treatment was administered to wild-type mouse embryonic fibroblasts (FAK+/+ MEFs) cultures and FAK knock out mouse embryonic fibroblasts (FAK−/− MEFs) cultures. As shown in FIG. 5A, immunocytochemistry of the cytoskeleton marker Acti-stain 555 phalloidin revealed that the cytoskeleton was degraded and migratory morphology including the formation of lamellipodia in FAK−/− MEFs was reduced as compared to FAK+/+ MEFs. In FIGS. 5B and 5C, Transwell migration assay showed that fewer FAK−/− MEFs migrated to the bottom membrane of inserts at 2 and 7 hrs after plating compared with FAK+/+ MEFs.

Figure 6:
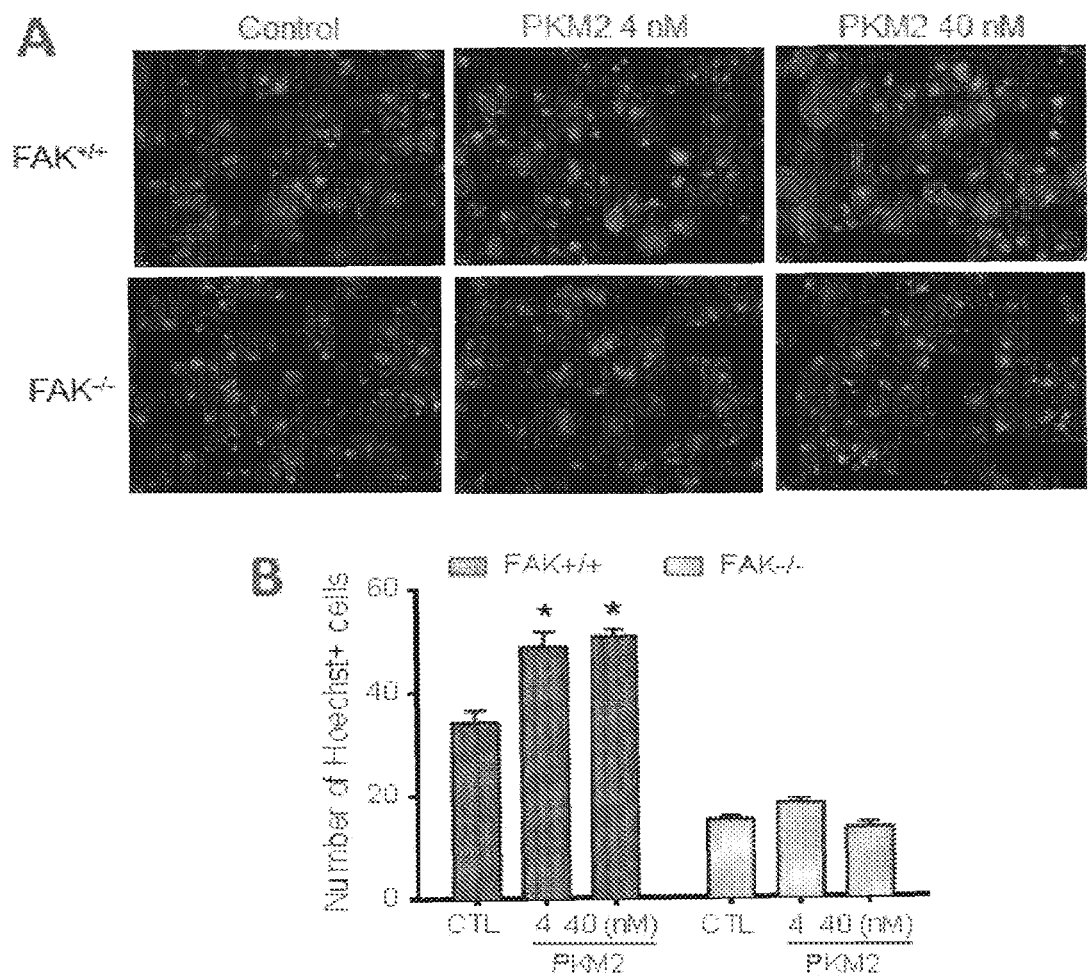
FIG. 6A provides immunocytochemistry images that show the effects of PKM2 administration on the migration of FAK$^{+/+}$ or FAK$^{-/-}$ MEFs in the transwell migration assay.
FIG. 6B provides a graphical representation of immunocytochemistry data showing the effects of PKM2 administration on the migration of FAK+/+ or FAK−/− MEFs in the transwell migration assay.

As shown in FIGS. 6A and 6B, rPKM2 exposure (4 nM or 40 nM) for 48 hrs prior to the transwell assay significantly increased the number of FAK+/+ MEFs migrating to the bottom membrane of inserts counted at 2 hrs after plating. This promoting effect of rPKM2, however, was not seen in FAK−/− MEFs. These results indicated that FAK plays an important mediator role in the effect of rPKM2 on cell migration.

Example 8

In vivo studies support that rPKM2 promotes the neuroblast migration in the ischemic brain. rPKM2 (160 ng/kg) was intranasally administrated to focal ischemic stroke mice as described above. Immunochemistry staining of DCX and proliferation marker BrdU was performed on coronal brain sections at 14 days after stroke. As shown in FIG. 7A, DCX/BrdU co-labeled cells were observed along the migrating track from the ipsilateral SVZ to the ischemic cortex. The data of FIG. 7B show that the distance of neuroblasts migrating towards the ischemic cortex was significantly longer in stroke animals received rPKM2 treatment than those received vehicle control. Furthermore, FIGS. 7C and 7D reveal that there was a significantly greater number of DCX/BrdU co-labeled cells in stroke animals that received rPKM2 treatment than those that received vehicle control.

Example 9

In post-stroke neurogenesis, neuronal differentiation is a later but critical process. Newly formed neurons in the peri-infarct region were examined. The mature neuronal marker NeuN and proliferation marker BrdU were co-stained at 14 days after stroke. AS shown in FIGS. 7E-7G, More BrdU-positive cells and NeuN/BrdU co-labeled cells were found in stroke animals that received the rPKM2 treatment. Further, co-applied STAT3 phosphorylation inhibitor BP-1-102 (3 mg/kg) blocked the effect of rPKM2 on the neuronal differentiation in the ischemic brain (FIG. 6E-G). These data show that rPkM2 treatment promotes neuronal differentiation in the ischemic brain.

Example 10

Figure 8:
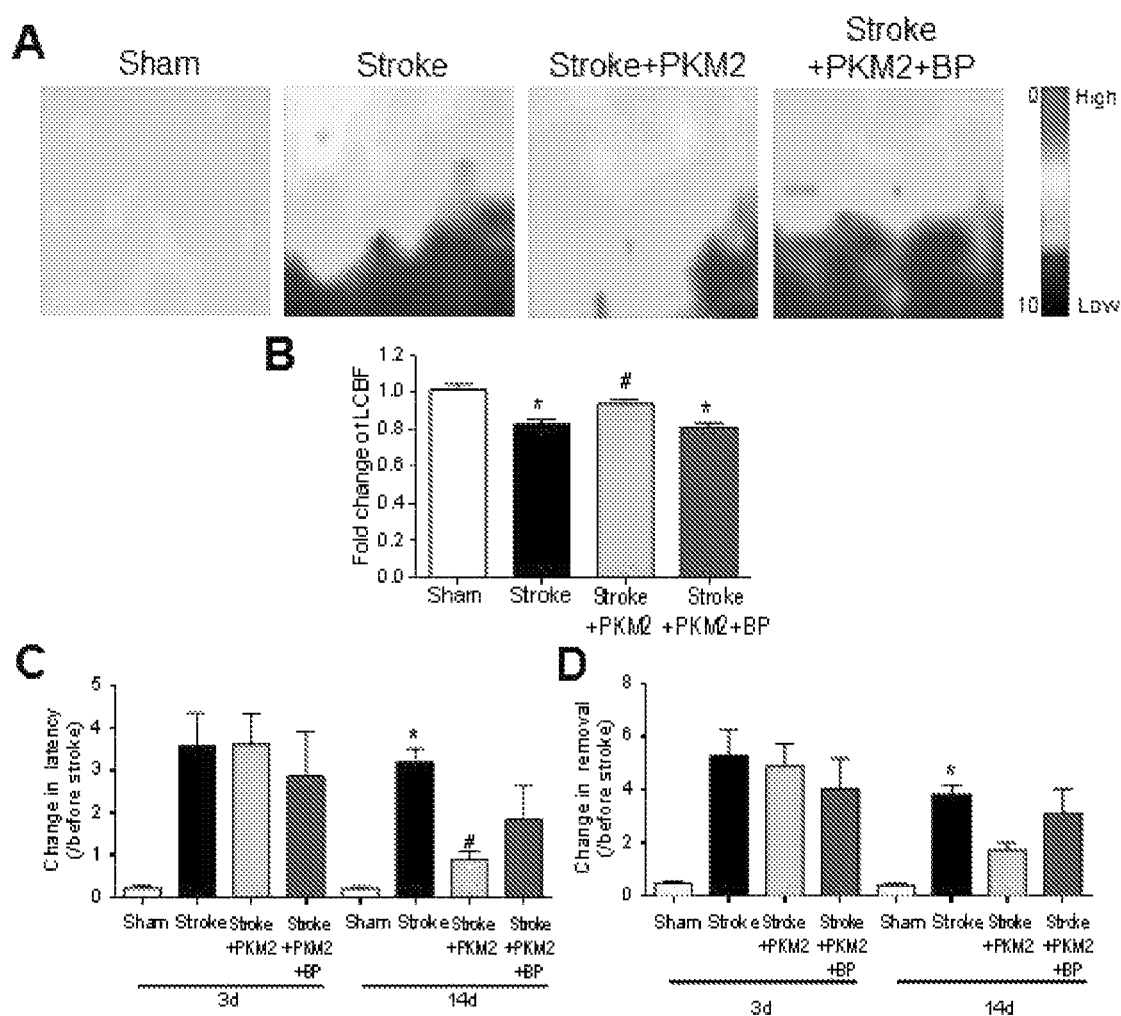
FIG. 8A shows local cerebral blood flow (LCBF) in the peri-infarct region following stroke using a Laser Doppler Scanner. The effect of PKM2 and PKM2/BP administration on LCBF to the peri-infarct region can be seen.
FIG. 8B provides a graphical representation of the effect of PKM2 and PKM2/BP administration on LCBF to the peri-infarct region following focal ischemic stroke.
FIG. 8C provides a graphical representation of the effect of PKM2 and PKM2/BP administration on the latency to contact the sticker in the adhesive removal test at 3 and 14 days following focal ischemic stroke.
FIG. 8D provides a graphical representation of the effect of PKM2 and PKM2/BP administration on time required to remove the sicker in the adhesive removal test at 3 and 14 days following focal ischemic stroke.

In vivo studies support that rPKM2 treatment enhances the local cerebral blood flow and behavioral recovery after ischemic stroke. The local cerebral blood flow (LCBF) in the peri-infarct region was determined using a Laser Doppler Scanner and sensorimotor function was determined using the adhesive removal test to examine whether improved neurogenesis by rPKM2 could result in functional improvements after stroke. As shown in FIGS. 8A and 8B, at 14 days after stroke, the LCBF of stroke control animals showed 80% of the basal level measured before stroke. Stroke animals received rPKM2 showed significantly higher level of LCBF. The STAT3 inhibitor BP-1-102 co-applied with rPKM2 blocked the effect of rPKM2 on LCBF.

In the adhesive removal test, the time spent for animals to feel the sticker (time to contact latency) and the time to remove the sticker (time to removal) at 3 and 14 days after stroke was examined. Three days after stroke, animals required a significantly longer time to feel and remove the sticker on their affected paws compared to the time needed before stroke (FIGS. 8C and 8D). There were no differences in this functional deficit in animals that received vehicle control, rPKM2 or rPKM2 plus BP-1-102 at this time point. However, as shown in FIGS. 8C and 8D, at 14 days after stroke, stroke animals received the rPKM2 treatment exhibited a significantly shorter latency to feel the sticker and a strong trend of shorter time in removing the sticker from their affected paws. These data suggest that rPKM2 treatment improved the sensorimotor function of stroke animals. Consistent with earlier observations, the STAT3 inhibitor BP-1-102 attenuated the beneficial effects of rPKM2 (FIGS. 7C and 7D).

Example 11

Figure 9:
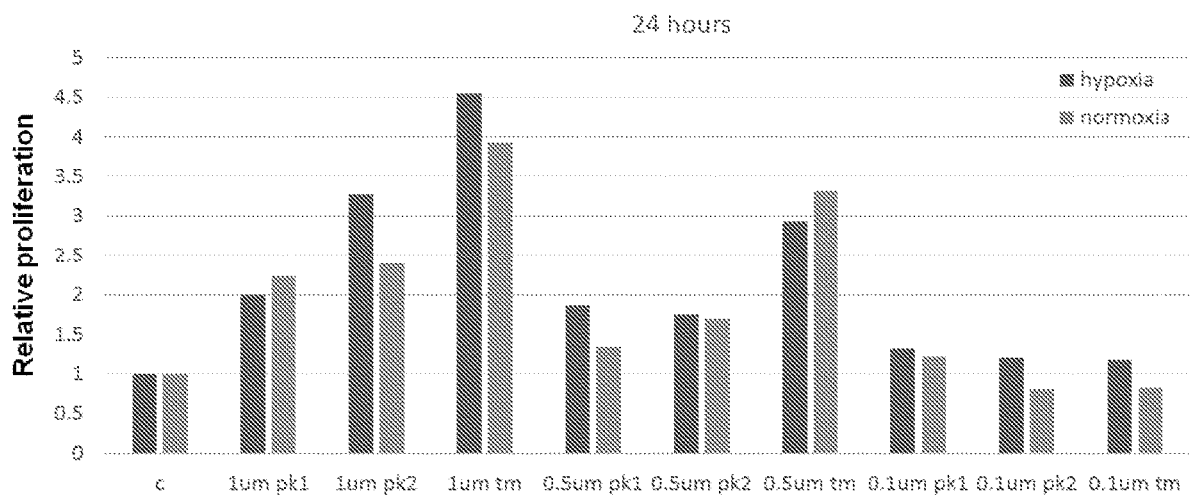
FIG. 9 is a graphical representation showing the effect of PK1, PK2, and dimer PK2 (tm) administration on myoblast proliferation in H9C2 cells in conditions of normoxia and hypoxia.

In vitro studies support that PKM2 promotes myoblast proliferation. Myoblast migration to and proliferation at myocardial infarction areas are essential for damage control and for recovery after myocardial infarction. To examine the promotion of myoblast proliferation, H9C2 cells (a line of myoblast cells) were treated with varying concentrations of PKM1, PKM2, or PKM2 as a dimer (tm) at both hypoxic and normal conditions. As a control, H9C2 cells were treated with a buffer solution. Relative proliferation above that of controls was then assessed in the H9C2 cells. As shown in FIG. 9, dimer PKM2 promotes H9C2 proliferation in both hypoxia and normoxia conditions.

Example 12

The following is an exemplary pyruvate kinase M2 amino acid sequence:
PKM2 Wild-type or SEQ. ID. NO. 4

```
         10         20         30         40
MSKPHSEAGT AFIQTQQLHA AMADTFLEHM CRLDIDSPPI 50         60         70         80
TARNTGIICT IGPASRSVET LKEMIKSGMN VARLNFSHGT 90        100        110        120
HEYHAETIKN VRTATESFAS DPILYRPVAV ALDTKGPEIR 130        140        150        160
TGLIKGSGTA EVELKKGATL KITLDNAYME KCDENILWLD 170        180        190        200
YKNICKVVEV GSKIYVDDGL ISLQVKQKGA DFLVTEVENG 210        220        230        240
GSLGSKKGVN LPGAAVDLPA VSEKDIQDLK FGVEQDVDMV 250        260        270        280
FASFIRKASD VHEVRKVLGE KGKNIKIISK IENHEGVRRF 290        300        310        320
DEILEASDGI MVARGDLGIE IPAEKVFLAQ KMMIGRCNRA 330        340        350        360
GKPVICATQM LESMIKKPRP TRAEGSDVAN AVLDGADCIM 370        380        390        400
LSGETAKGDY PLEAVRMQHL IAREAEAAIY HLQLFEELRR 410        420        430        440
LAPITSDPTE ATAVGAVEAS FKCCSGAIIV LTKSGRSAHQ 450        460        470        480
VARYRPRAPI IAVTRNPQTA RQAHLYRGIF PVLCKDPVQE 490        500        510
AWAEDVDLRV NFAMNVGKAR GFFKKGDVVI VLTGWRPGSG 520                              530
FTNTMRVVPV P
```

Example 13

The following is an exemplary pyruvate kinase M2 amino acid sequence having three mutations (R399E, K422A, and N523A) or SEQ ID.: 5.

```
         10         20         30         40
MSKPHSEAGT AFIQTQQLHA AMADTFLEHM CRLDIDSPPI 50         60         70         80
TARNTGIICT IGPASRSVET LKEMIKSGMN VARLNFSHGT 90        100        110        120
HEYHAETIKN VRTATESFAS DPILYRPVAV ALDTKGPEIR 130        140        150        160
TGLIKGSGTA EVELKKGATL KITLDNAYME KCDENILWLD 170        180        190        200
YKNICKVVEV GSKIYVDDGL ISLQVKQKGA DFLVTEVENG 210        220        230        240
GSLGSKKGVN LPGAAVDLPA VSEKDIQDLK FGVEQDVDMV 250        260        270        280
FASFIRKASD VHEVRKVLGE KGKNIKIISK IENHEGVRRF 290        300        310        320
DEILEASDGI MVARGDLGIE IPAEKVFLAQ KMMIGRCNRA 330        340        350        360
GKPVICATQM LESMIKKPRP TRAEGSDVAN AVLDGADCIM 370        380        390        400
LSGETAKGDY PLEAVRMQHL IAREAEAAIY HLQLFEELER 410        420        430        440
LAPITSDPTE ATAVGAVEAS FACCSGAIIV LTKSGRSAHQ
```

-continued

```
          450        460        470        480
VARYRPRAPI IAVTRNPQTA RQAHLYRGIF PVLCKDPVQE 490        500        510
AWAEDVDLRV NFAMNVGKAR GFFKKGDVVI VLTGWRPGSG 520                   530
FTATMRVVPV P
```

Example 14

Figure 10:
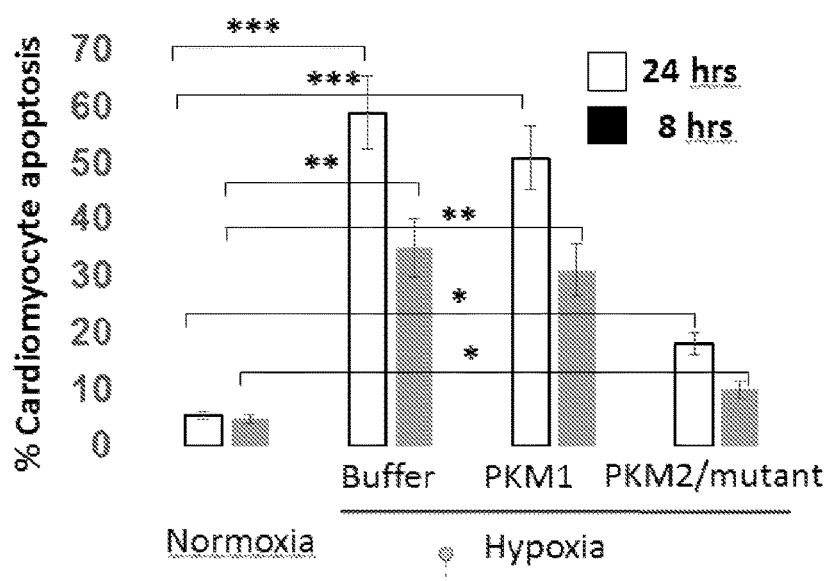
FIG. 10 is a graphical representation showing the effect of PK1, PK2, and dimer PK2 (tm) administration on cardiomyocytes proliferation in conditions of normoxia and hypoxia.

In vitro studies support that PKM2 promotes cardiomyocytes proliferation. To examine the promotion of cardiomyocytes proliferation, H9C2 human myoblast cells were treated with concentrations of PKM1, PKM2, or PKM2 as a dimer (tm) at both hypoxic and normal conditions. As a control, the cells were treated with a buffer solution. Relative proliferation above that of controls was then assessed in the H9C2 cells. As shown in FIG. 10, dimer PKM2 promotes proliferation in both hypoxia and normoxia conditions. PKM2 mutant protect cardiomyocytes from apoptosis under hypoxia conditions. Tissue slices were cut from hearts of sacrificed mice. The tissue slices were then cultured under normoxia or hypoxia (in a hypoxia chamber) conditions for 8 or 24 hours. The tissue slices were culture in presence of buffer, PKM1, and PKM2/mutant. After incubation, tissue slices were sectioned for apoptosis analyses. Apoptosis of cardiomyocytes in the sections was analyzed by TUNEL stains. Error bars are standard deviations of five tissue slices (three sections were analyzed for each slice). The p-values were, $P<0.005$, $P<0.01$, and $P<0.05$, respectively.

The foregoing detailed description and the appended figures have been presented only for illustrative and descriptive purposes. They are not intended to be exhaustive and are not intended to limit the spirit of the invention. The embodiments were selected and described to best explain the principles of the invention and its practical applications. One skilled in the art will recognize that many variations can be made to the invention disclosed in this specification without departing from the scope and spirit of the invention.

The invention claimed is:

1. A method of promoting cellular regeneration in an ischemic tissue or tissue damaged by ischemia in a subject, comprising: administering a composition containing a modified pyruvate kinase M2 (PKM2) protein according to sequence identity to SEQ ID NO:5 to the ischemic tissue or the tissue damaged by ischemia, wherein the modified PKM2 possesses mutations differing from the wild-type PKM2 sequence stabilize in a dimer form;
the modified pyruvate kinase M2 (PKM2) protein is not a constitutive dimer of PKM2;
the modified PKM2 comprises three amino acid substitutions R399E, K422A, and N523A based on the sequence of wild-type human PKM2 (SEQ ID NO: 4) that result in a stabilized dimer form of PKM2 relative to and different from wild-type PKM2;
the modified pyruvate kinase M2 (PKM2) protein promotes cellular regeneration in ischemic tissue or tissue damaged by ischemia;
the modified pyruvate kinase M2 (PKM2) protein is a dimer; the
modified PKM2 is human PKM2; and
the modified pyruvate kinase M2 (PKM2) protein enhances cellular regeneration over new blood vessel formation to a greater extent than would be achieved solely through new blood vessel formation.

2. The method of claim 1, wherein the ischemic tissue is cardiac tissue damaged as result of ischemia condition caused by acute myocardial infarction, myocardial infarction, cardiomyopathy, unstable angina, refractory angina, heart attack, heart failure, cor pulmonale, vein graft diseases, coronary heart diseases, occlusive coronary thrombus, valvular heart diseases, inflammatory cardiomegaly, atherosclerosis, acute pericarditis and Dresslers syndrome, inflammatory heart condition or a necrotizing heart condition, wherein the treatment promotes on cellular regeneration.

3. The method of claim 1, wherein the subject has limb ischemia (CLI) cerebrovascular ischemia, renal ischemia, pulmonary ischemia, or intestinal ischemia.

4. The method of claim 1, wherein the protein is disposed within a pharmaceutically acceptable carrier.

5. The method of claim 1, wherein the ischemic tissue comprises the peri-infarct region of the brain.

6. The method of claim 1, wherein the PKM2 is intranasally administered.

7. The method of claim 1, wherein the modified pyruvate kinase M2 (PKM2) protein forms a dimer at a concentration greater than 1 μM.

8. A method of promoting cellular regeneration in ischemic tissue or tissue damaged by ischemia in a subject, comprising:
administering a composition containing a modified pyruvate kinase M2 (PKM2) protein to the ischemic tissue or tissue damaged by ischemia, wherein the modified PKM2 protein (a) has mutations that stabilize it in a dimer form, differing from the wild-type PKM2 sequence, (b) is not a constitutive dimer of PKM2, (c) has a sequence according to SEQ ID NO: 5 comprising three amino acid substitutions R399E, K422A, and N523A based on the sequence of SEQ ID NO: 4 that results in a stabilized dimer form compared to the wild-type PKM2, and (d), promotes and enhances cellular regeneration within the damaged tissue; wherein the enhanced cellular regeneration promotes tissue repair and cell proliferation within the ischemic tissue or tissue damaged by ischemia; the modified pyruvate kinase M2 (PKM2) protein forms a dimer at a concentration greater than 1 μM; the modified pyruvate kinase M2 (PKM2) protein enhances cellular regeneration to a greater extent than would be achieved solely through new blood vessel formation; and the subject is in need of cellular regeneration.

* * * * *

SEQUENCE LISTING

```
<160> NUMBER OF SEQ ID NOS: 5

<210> SEQ ID NO 1
<211> LENGTH: 531
<212> TYPE: PRT
<213> ORGANISM: Human

<400> SEQUENCE: 1

Met Ser Lys Pro His Ser Glu Ala Gly Thr Ala Phe Ile Gln Thr Gln
1               5                   10                  15

Gln Leu His Ala Ala Met Ala Asp Thr Phe Leu Glu His Met Cys Arg
            20                  25                  30

Leu Asp Ile Asp Ser Pro Pro Ile Thr Ala Arg Asn Thr Gly Ile Ile
        35                  40                  45

Cys Thr Ile Gly Pro Ala Ser Arg Ser Val Glu Thr Leu Lys Glu Met
    50                  55                  60

Ile Lys Ser Gly Met Asn Val Ala Arg Leu Asn Phe Ser His Gly Thr
65                  70                  75                  80

His Glu Tyr His Ala Glu Thr Ile Lys Asn Val Arg Thr Ala Thr Glu
                85                  90                  95

Ser Phe Ala Ser Asp Pro Ile Leu Tyr Arg Pro Val Ala Val Ala Leu
            100                 105                 110

Asp Thr Lys Gly Pro Glu Ile Arg Thr Gly Leu Ile Lys Gly Ser Gly
        115                 120                 125

Thr Ala Glu Val Glu Leu Lys Lys Gly Ala Thr Leu Lys Ile Thr Leu
    130                 135                 140

Asp Asn Ala Tyr Met Glu Lys Cys Asp Glu Asn Ile Leu Trp Leu Asp
145                 150                 155                 160

Tyr Lys Asn Ile Cys Lys Val Val Glu Val Gly Ser Lys Ile Tyr Val
                165                 170                 175

Asp Asp Gly Leu Ile Ser Leu Gln Val Lys Gln Lys Gly Ala Asp Phe
            180                 185                 190

Leu Val Thr Glu Val Glu Asn Gly Gly Ser Leu Gly Ser Lys Lys Gly
        195                 200                 205

Val Asn Leu Pro Gly Ala Ala Val Asp Leu Pro Ala Val Ser Glu Lys
    210                 215                 220
```

-continued

Asp Ile Gln Asp Leu Lys Phe Gly Val Glu Gln Asp Val Asp Met Val
225                 230                 235                 240

Phe Ala Ser Phe Ile Arg Lys Ala Ser Asp Val His Glu Val Arg Lys
            245                 250                 255

Val Leu Gly Glu Lys Gly Lys Asn Ile Lys Ile Ile Ser Lys Ile Glu
        260                 265                 270

Asn His Glu Gly Val Arg Arg Phe Asp Glu Ile Leu Glu Ala Ser Asp
    275                 280                 285

Gly Ile Met Val Ala Arg Gly Asp Leu Gly Ile Glu Ile Pro Ala Glu
290                 295                 300

Lys Val Phe Leu Ala Gln Lys Met Met Ile Gly Arg Cys Asn Arg Ala
305                 310                 315                 320

Gly Lys Pro Val Ile Cys Ala Thr Gln Met Leu Glu Ser Met Ile Lys
            325                 330                 335

Lys Pro Arg Pro Thr Arg Ala Glu Gly Ser Asp Val Ala Asn Ala Val
        340                 345                 350

Leu Asp Gly Ala Asp Cys Ile Met Leu Ser Gly Glu Thr Ala Lys Gly
    355                 360                 365

Asp Tyr Pro Leu Glu Ala Val Arg Met Gln His Leu Ile Ala Arg Glu
370                 375                 380

Ala Glu Ala Ala Ile Tyr His Leu Gln Leu Phe Glu Glu Leu Arg Arg
385                 390                 395                 400

Leu Ala Pro Ile Thr Ser Asp Pro Thr Glu Ala Thr Ala Val Gly Ala
            405                 410                 415

Val Glu Ala Ser Phe Lys Cys Cys Ser Gly Ala Ile Ile Val Leu Thr
        420                 425                 430

Lys Ser Gly Arg Ser Ala His Gln Val Ala Arg Tyr Arg Pro Arg Ala
    435                 440                 445

Pro Ile Ile Ala Val Thr Arg Asn Pro Gln Thr Ala Arg Gln Ala His
450                 455                 460

Leu Tyr Arg Gly Ile Phe Pro Val Leu Cys Lys Asp Pro Val Gln Glu
465                 470                 475                 480

Ala Trp Ala Glu Asp Val Asp Leu Arg Val Asn Phe Ala Met Asn Val
            485                 490                 495

Gly Lys Ala Arg Gly Phe Phe Lys Lys Gly Asp Val Val Ile Val Leu
        500                 505                 510

Thr Gly Trp Arg Pro Gly Ser Gly Phe Thr Asn Thr Met Arg Val Val
    515                 520                 525

Pro Val Pro
530

<210> SEQ ID NO 2
<211> LENGTH: 531
<212> TYPE: PRT
<213> ORGANISM: Artificial Sequence
<220> FEATURE:
<223> OTHER INFORMATION: Mutant

<400> SEQUENCE: 2

Met Ser Lys Pro His Ser Glu Ala Gly Thr Ala Phe Ile Gln Thr Gln
1               5                   10                  15

Gln Leu His Ala Ala Met Ala Asp Thr Phe Leu Glu His Met Cys Arg
            20                  25                  30

Leu Asp Ile Asp Ser Pro Pro Ile Thr Ala Arg Asn Thr Gly Ile Ile
        35                  40                  45

```
Cys Thr Ile Gly Pro Ala Ser Arg Ser Val Glu Thr Leu Lys Glu Met
     50                  55                  60
Ile Lys Ser Gly Met Asn Val Ala Arg Leu Asn Phe Ser His Gly Thr
 65                  70                  75                  80
His Glu Tyr His Ala Glu Thr Ile Lys Asn Val Arg Thr Ala Thr Glu
                 85                  90                  95
Ser Phe Ala Ser Asp Pro Ile Leu Tyr Arg Pro Val Ala Val Ala Leu
                100                 105                 110
Asp Thr Lys Gly Pro Glu Ile Arg Thr Gly Leu Ile Lys Gly Ser Gly
                115                 120                 125
Thr Ala Glu Val Glu Leu Lys Lys Gly Ala Thr Leu Lys Ile Thr Leu
130                 135                 140
Asp Asn Ala Tyr Met Glu Lys Cys Asp Glu Asn Ile Leu Trp Leu Asp
145                 150                 155                 160
Tyr Lys Asn Ile Cys Lys Val Val Glu Val Gly Ser Lys Ile Tyr Val
                165                 170                 175
Asp Asp Gly Leu Ile Ser Leu Gln Val Lys Gln Lys Gly Ala Asp Phe
                180                 185                 190
Leu Val Thr Glu Val Glu Asn Gly Gly Ser Leu Gly Ser Lys Lys Gly
                195                 200                 205
Val Asn Leu Pro Gly Ala Ala Val Asp Leu Pro Ala Val Ser Glu Lys
                210                 215                 220
Asp Ile Gln Asp Leu Lys Phe Gly Val Glu Gln Asp Val Asp Met Val
225                 230                 235                 240
Phe Ala Ser Phe Ile Arg Lys Ala Ser Asp Val His Glu Val Arg Lys
                245                 250                 255
Val Leu Gly Glu Lys Gly Lys Asn Ile Lys Ile Ile Ser Lys Ile Glu
                260                 265                 270
Asn His Glu Gly Val Arg Arg Phe Asp Glu Ile Leu Glu Ala Ser Asp
                275                 280                 285
Gly Ile Met Val Ala Arg Gly Asp Leu Gly Ile Glu Ile Pro Ala Glu
                290                 295                 300
Lys Val Phe Leu Ala Gln Lys Met Met Ile Gly Arg Cys Asn Arg Ala
305                 310                 315                 320
Gly Lys Pro Val Ile Cys Ala Thr Gln Met Leu Glu Ser Met Ile Lys
                325                 330                 335
Lys Pro Arg Pro Thr Arg Ala Glu Gly Ser Asp Val Ala Asn Ala Val
                340                 345                 350
Leu Asp Gly Ala Asp Cys Ile Met Leu Ser Gly Glu Thr Ala Lys Gly
                355                 360                 365
Asp Tyr Pro Leu Glu Ala Val Arg Met Gln His Leu Ile Ala Arg Glu
                370                 375                 380
Ala Glu Ala Ala Ile Tyr His Leu Gln Leu Phe Glu Glu Leu Glu Arg
385                 390                 395                 400
Leu Ala Pro Ile Thr Ser Asp Pro Thr Glu Ala Thr Ala Val Gly Ala
                405                 410                 415
Val Glu Ala Ser Phe Lys Cys Cys Ser Gly Ala Ile Ile Val Leu Thr
                420                 425                 430
Lys Ser Gly Arg Ser Ala His Gln Val Ala Arg Tyr Arg Pro Arg Ala
                435                 440                 445
Pro Ile Ile Ala Val Thr Arg Asn Pro Gln Thr Ala Arg Gln Ala His
                450                 455                 460
Leu Tyr Arg Gly Ile Phe Pro Val Leu Cys Lys Asp Pro Val Gln Glu
```

```
              465                 470                 475                 480
         Ala Trp Ala Glu Asp Val Asp Leu Arg Val Asn Phe Ala Met Asn Val
                         485                 490                 495
         Gly Lys Ala Arg Gly Phe Phe Lys Lys Gly Asp Val Val Ile Val Leu
                         500                 505                 510
         Thr Gly Trp Arg Pro Gly Ser Gly Phe Thr Asn Thr Met Arg Val Val
                         515                 520                 525
         Pro Val Pro
                 530

<210> SEQ ID NO 3
         <211> LENGTH: 531
         <212> TYPE: PRT
         <213> ORGANISM: Artificial Sequence
         <220> FEATURE:
         <223> OTHER INFORMATION: Mutant

<400> SEQUENCE: 3

Met Ser Lys Pro His Ser Glu Ala Gly Thr Ala Phe Ile Gln Thr Gln
         1               5                   10                  15

Gln Leu His Ala Ala Met Ala Asp Thr Phe Leu Glu His Met Cys Arg
                         20                  25                  30

Leu Asp Ile Asp Ser Pro Pro Ile Thr Ala Arg Asn Thr Gly Ile Ile
                     35                  40                  45

Cys Thr Ile Gly Pro Ala Ser Arg Ser Val Glu Thr Leu Lys Glu Met
                 50                  55                  60

Ile Lys Ser Gly Met Asn Val Ala Arg Leu Asn Phe Ser His Gly Thr
         65                  70                  75                  80

His Glu Tyr His Ala Glu Thr Ile Lys Asn Val Arg Thr Ala Thr Glu
                         85                  90                  95

Ser Phe Ala Ser Asp Pro Ile Leu Glu Arg Pro Val Ala Val Ala Leu
                         100                 105                 110

Asp Thr Lys Gly Pro Glu Ile Arg Thr Gly Leu Ile Lys Gly Ser Gly
                         115                 120                 125

Thr Ala Glu Val Glu Leu Lys Lys Gly Ala Thr Leu Lys Ile Thr Leu
                     130                 135                 140

Asp Asn Ala Tyr Met Glu Lys Cys Asp Glu Asn Ile Leu Trp Leu Asp
         145                 150                 155                 160

Tyr Lys Asn Ile Cys Lys Val Val Glu Val Gly Ser Lys Ile Tyr Val
                         165                 170                 175

Asp Asp Gly Leu Ile Ser Leu Gln Val Lys Gln Lys Gly Ala Asp Phe
                         180                 185                 190

Leu Val Thr Glu Val Glu Asn Gly Gly Ser Leu Gly Ser Lys Lys Gly
                         195                 200                 205

Val Asn Leu Pro Gly Ala Ala Val Asp Leu Pro Ala Val Ser Glu Lys
                     210                 215                 220

Asp Ile Gln Asp Leu Lys Phe Gly Val Glu Gln Asp Val Asp Met Val
         225                 230                 235                 240

Phe Ala Ser Phe Ile Arg Lys Ala Ser Asp Val His Glu Val Arg Lys
                         245                 250                 255

Val Leu Gly Glu Lys Gly Lys Asn Ile Lys Ile Ile Ser Lys Ile Glu
                         260                 265                 270

Asn His Glu Gly Val Arg Arg Phe Asp Glu Ile Leu Glu Ala Ser Asp
                         275                 280                 285

Gly Ile Met Val Ala Arg Gly Asp Leu Gly Ile Glu Ile Pro Ala Glu
```

```
            290                 295                 300
Lys Val Phe Leu Ala Gln Lys Met Met Ile Gly Arg Cys Asn Arg Ala
305                 310                 315                 320

Gly Lys Pro Val Ile Cys Ala Thr Gln Met Leu Glu Ser Met Ile Lys
                325                 330                 335

Lys Pro Arg Pro Thr Arg Ala Glu Gly Ser Asp Val Ala Asn Ala Val
                340                 345                 350

Leu Asp Gly Ala Asp Cys Ile Met Leu Ser Gly Glu Thr Ala Lys Gly
                355                 360                 365

Asp Tyr Pro Leu Glu Ala Val Arg Met Gln His Leu Ile Ala Arg Glu
                370                 375                 380

Ala Glu Ala Ala Ile Tyr His Leu Gln Leu Phe Glu Glu Leu Arg Arg
385                 390                 395                 400

Leu Ala Pro Ile Thr Ser Asp Pro Thr Glu Ala Thr Ala Val Gly Ala
                405                 410                 415

Val Glu Ala Ser Phe Lys Cys Cys Ser Gly Ala Ile Ile Val Leu Thr
                420                 425                 430

Lys Ser Gly Arg Ser Ala His Gln Val Ala Arg Tyr Arg Pro Arg Ala
                435                 440                 445

Pro Ile Ile Ala Val Thr Arg Asn Pro Gln Thr Ala Arg Gln Ala His
                450                 455                 460

Leu Tyr Arg Gly Ile Phe Pro Val Leu Cys Lys Asp Pro Val Gln Glu
465                 470                 475                 480

Ala Trp Ala Glu Asp Val Asp Leu Arg Val Asn Phe Ala Met Asn Val
                485                 490                 495

Gly Lys Ala Arg Gly Phe Phe Lys Lys Gly Asp Val Val Ile Val Leu
                500                 505                 510

Thr Gly Trp Arg Pro Gly Ser Gly Phe Thr Asn Thr Met Arg Val Val
                515                 520                 525

Pro Val Pro
                530

<210> SEQ ID NO 4
<211> LENGTH: 531
<212> TYPE: PRT
<213> ORGANISM: Human

<400> SEQUENCE: 4

Met Ser Lys Pro His Ser Glu Ala Gly Thr Ala Phe Ile Gln Thr Gln
1                   5                   10                  15

Gln Leu His Ala Ala Met Ala Asp Thr Phe Leu Glu His Met Cys Arg
                20                  25                  30

Leu Asp Ile Asp Ser Pro Pro Ile Thr Ala Arg Asn Thr Gly Ile Ile
                35                  40                  45

Cys Thr Ile Gly Pro Ala Ser Arg Ser Val Glu Thr Leu Lys Glu Met
                50                  55                  60

Ile Lys Ser Gly Met Asn Val Ala Arg Leu Asn Phe Ser His Gly Thr
65                  70                  75                  80

His Glu Tyr His Ala Glu Thr Ile Lys Asn Val Arg Thr Ala Thr Glu
                85                  90                  95

Ser Phe Ala Ser Asp Pro Ile Leu Tyr Arg Pro Val Ala Val Ala Leu
                100                 105                 110

Asp Thr Lys Gly Pro Glu Ile Arg Thr Gly Leu Ile Lys Gly Ser Gly
                115                 120                 125
```

```
Thr Ala Glu Val Glu Leu Lys Lys Gly Ala Thr Leu Lys Ile Thr Leu
130                 135                 140
Asp Asn Ala Tyr Met Glu Lys Cys Asp Glu Asn Ile Leu Trp Leu Asp
145                 150                 155                 160
Tyr Lys Asn Ile Cys Lys Val Glu Val Gly Ser Lys Ile Tyr Val
                165                 170                 175
Asp Asp Gly Leu Ile Ser Leu Gln Val Lys Gln Lys Gly Ala Asp Phe
                180                 185                 190
Leu Val Thr Glu Val Glu Asn Gly Gly Ser Leu Gly Ser Lys Lys Gly
            195                 200                 205
Val Asn Leu Pro Gly Ala Ala Val Asp Leu Pro Ala Val Ser Glu Lys
210                 215                 220
Asp Ile Gln Asp Leu Lys Phe Gly Val Glu Gln Asp Val Asp Met Val
225                 230                 235                 240
Phe Ala Ser Phe Ile Arg Lys Ala Ser Asp Val His Glu Val Arg Lys
                245                 250                 255
Val Leu Gly Glu Lys Gly Lys Asn Ile Lys Ile Ile Ser Lys Ile Glu
                260                 265                 270
Asn His Glu Gly Val Arg Arg Phe Asp Glu Ile Leu Glu Ala Ser Asp
            275                 280                 285
Gly Ile Met Val Ala Arg Gly Asp Leu Gly Ile Glu Ile Pro Ala Glu
290                 295                 300
Lys Val Phe Leu Ala Gln Lys Met Met Ile Gly Arg Cys Asn Arg Ala
305                 310                 315                 320
Gly Lys Pro Val Ile Cys Ala Thr Gln Met Leu Glu Ser Met Ile Lys
                325                 330                 335
Lys Pro Arg Pro Thr Arg Ala Glu Gly Ser Asp Val Ala Asn Ala Val
                340                 345                 350
Leu Asp Gly Ala Asp Cys Ile Met Leu Ser Gly Glu Thr Ala Lys Gly
            355                 360                 365
Asp Tyr Pro Leu Glu Ala Val Arg Met Gln His Leu Ile Ala Arg Glu
370                 375                 380
Ala Glu Ala Ala Ile Tyr His Leu Gln Leu Phe Glu Glu Leu Arg Arg
385                 390                 395                 400
Leu Ala Pro Ile Thr Ser Asp Pro Thr Glu Ala Thr Ala Val Gly Ala
                405                 410                 415
Val Glu Ala Ser Phe Lys Cys Cys Ser Gly Ala Ile Ile Val Leu Thr
                420                 425                 430
Lys Ser Gly Arg Ser Ala His Gln Val Ala Arg Tyr Arg Pro Arg Ala
            435                 440                 445
Pro Ile Ile Ala Val Thr Arg Asn Pro Gln Thr Ala Arg Gln Ala His
450                 455                 460
Leu Tyr Arg Gly Ile Phe Pro Val Leu Cys Lys Asp Pro Val Gln Glu
465                 470                 475                 480
Ala Trp Ala Glu Asp Val Asp Leu Arg Val Asn Phe Ala Met Asn Val
                485                 490                 495
Gly Lys Ala Arg Gly Phe Phe Lys Lys Gly Asp Val Val Ile Val Leu
                500                 505                 510
Thr Gly Trp Arg Pro Gly Ser Gly Phe Thr Asn Thr Met Arg Val Val
            515                 520                 525
Pro Val Pro
530
```

```
<210> SEQ ID NO 5
<211> LENGTH: 531
<212> TYPE: PRT
<213> ORGANISM: Artificial Sequence
<220> FEATURE:
<223> OTHER INFORMATION: Mutant sequence

<400> SEQUENCE: 5

Met Ser Lys Pro His Ser Glu Ala Gly Thr Ala Phe Ile Gln Thr Gln
1               5                   10                  15

Gln Leu His Ala Ala Met Ala Asp Thr Phe Leu Glu His Met Cys Arg
            20                  25                  30

Leu Asp Ile Asp Ser Pro Pro Ile Thr Ala Arg Asn Thr Gly Ile Ile
        35                  40                  45

Cys Thr Ile Gly Pro Ala Ser Arg Ser Val Glu Thr Leu Lys Glu Met
    50                  55                  60

Ile Lys Ser Gly Met Asn Val Ala Arg Leu Asn Phe Ser His Gly Thr
65                  70                  75                  80

His Glu Tyr His Ala Glu Thr Ile Lys Asn Val Arg Thr Ala Thr Glu
                85                  90                  95

Ser Phe Ala Ser Asp Pro Ile Leu Tyr Arg Pro Val Ala Val Ala Leu
            100                 105                 110

Asp Thr Lys Gly Pro Glu Ile Arg Thr Gly Leu Ile Lys Gly Ser Gly
        115                 120                 125

Thr Ala Glu Val Glu Leu Lys Lys Gly Ala Thr Leu Lys Ile Thr Leu
    130                 135                 140

Asp Asn Ala Tyr Met Glu Lys Cys Asp Glu Asn Ile Leu Trp Leu Asp
145                 150                 155                 160

Tyr Lys Asn Ile Cys Lys Val Val Glu Val Gly Ser Lys Ile Tyr Val
                165                 170                 175

Asp Asp Gly Leu Ile Ser Leu Gln Val Lys Gln Lys Gly Ala Asp Phe
            180                 185                 190

Leu Val Thr Glu Val Glu Asn Gly Gly Ser Leu Gly Ser Lys Lys Gly
        195                 200                 205

Val Asn Leu Pro Gly Ala Ala Val Asp Leu Pro Ala Val Ser Glu Lys
    210                 215                 220

Asp Ile Gln Asp Leu Lys Phe Gly Val Glu Gln Asp Val Asp Met Val
225                 230                 235                 240

Phe Ala Ser Phe Ile Arg Lys Ala Ser Asp Val His Glu Val Arg Lys
                245                 250                 255

Val Leu Gly Glu Lys Gly Lys Asn Ile Lys Ile Ile Ser Lys Ile Glu
            260                 265                 270

Asn His Glu Gly Val Arg Arg Phe Asp Glu Ile Leu Glu Ala Ser Asp
        275                 280                 285

Gly Ile Met Val Ala Arg Gly Asp Leu Gly Ile Glu Ile Pro Ala Glu
    290                 295                 300

Lys Val Phe Leu Ala Gln Lys Met Met Ile Gly Arg Cys Asn Arg Ala
305                 310                 315                 320

Gly Lys Pro Val Ile Cys Ala Thr Gln Met Leu Glu Ser Met Ile Lys
                325                 330                 335

Lys Pro Arg Pro Thr Arg Ala Glu Gly Ser Asp Val Ala Asn Ala Val
            340                 345                 350

Leu Asp Gly Ala Asp Cys Ile Met Leu Ser Gly Glu Thr Ala Lys Gly
        355                 360                 365

Asp Tyr Pro Leu Glu Ala Val Arg Met Gln His Leu Ile Ala Arg Glu
```

-continued

```
                    370                 375                 380
Ala Glu Ala Ala Ile Tyr His Leu Gln Leu Phe Glu Glu Leu Glu Arg
385                 390                 395                 400

Leu Ala Pro Ile Thr Ser Asp Pro Thr Glu Ala Thr Ala Val Gly Ala
                405                 410                 415

Val Glu Ala Ser Phe Ala Cys Cys Ser Gly Ala Ile Ile Val Leu Thr
            420                 425                 430

Lys Ser Gly Arg Ser Ala His Gln Val Ala Arg Tyr Arg Pro Arg Ala
        435                 440                 445

Pro Ile Ile Ala Val Thr Arg Asn Pro Gln Thr Ala Arg Gln Ala His
    450                 455                 460

Leu Tyr Arg Gly Ile Phe Pro Val Leu Cys Lys Asp Pro Val Gln Glu
465                 470                 475                 480

Ala Trp Ala Glu Asp Val Asp Leu Arg Val Asn Phe Ala Met Asn Val
            485                 490                 495

Gly Lys Ala Arg Gly Phe Phe Lys Lys Gly Asp Val Val Ile Val Leu
            500                 505                 510

Thr Gly Trp Arg Pro Gly Ser Gly Phe Thr Ala Thr Met Arg Val Val
        515                 520                 525

Pro Val Pro
530
```